(12) United States Patent
Edraki et al.

(10) Patent No.: US 12,444,173 B2
(45) Date of Patent: Oct. 14, 2025

(54) IMAGE COMPONENT GENERATION BASED ON APPLICATION OF ITERATIVE LEARNING ON AUTOENCODER MODEL AND TRANSFORMER MODEL

(71) Applicants: SONY GROUP CORPORATION, Tokyo (JP); SONY CORPORATION OF AMERICA, New York, NY (US)

(72) Inventors: Marzieh Edraki, San Jose, CA (US); Akira Nakamura, San Jose, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 412 days.

(21) Appl. No.: 18/177,084

(22) Filed: Mar. 1, 2023

(65) Prior Publication Data
US 2024/0029411 A1 Jan. 25, 2024

Related U.S. Application Data

(60) Provisional application No. 63/368,264, filed on Jul. 13, 2022.

(51) Int. Cl.
*G06V 10/774* (2022.01)
*G06V 10/82* (2022.01)
(52) U.S. Cl.
CPC ............ *G06V 10/774* (2022.01); *G06V 10/82* (2022.01)
(58) Field of Classification Search
None
See application file for complete search history.

(56) References Cited

U.S. PATENT DOCUMENTS

| | | | |
|---|---|---|---|
| 2022/0108183 A1 | 4/2022 | Arpit | |
| 2023/0100413 A1* | 3/2023 | Zhu | G06T 7/11 |
| | | | 375/240.18 |
| 2023/0360294 A1* | 11/2023 | Aggarwal | G06T 7/13 |

FOREIGN PATENT DOCUMENTS

| | | |
|---|---|---|
| CN | 113449135 A | 9/2021 |
| JP | 2020061023 A | 4/2020 |

(Continued)

OTHER PUBLICATIONS

Mendez, et al., "How to Reuse and Compose Knowledge for a Lifetime of Tasks: A Survey on Continual Learning and Functional Composition", ResearchGate.net, Jul. 15, 2022, 60 pages.

(Continued)

*Primary Examiner* — Leon Flores
(74) *Attorney, Agent, or Firm* — CHIP LAW GROUP

(57) ABSTRACT

An electronic device and method for image component generation based on application of iterative learning on autoencoder model and transformer model is provided. The electronic device fine-tunes, based on first training data including a first set of images, an autoencoder model and a transformer model. The autoencoder model includes an encoder model, a learned codebook, a generator model, and a discriminator model. The electronic device selects a subset of images from the first training data. The electronic device applies the encoder model on the selected subset of images. The electronic device generates second training data including a second set of images, based on the application of the encoder model. The generated second training data corresponds to a quantized latent representation of the selected subset of images. The electronic device pre-trains the autoencoder model to create a next generation of the autoencoder model, based on the generated second training data.

20 Claims, 14 Drawing Sheets

(56) References Cited

FOREIGN PATENT DOCUMENTS

JP          2022013136 A    1/2022
WO      WO-2022125290 A1   6/2022

OTHER PUBLICATIONS

Rajeswar, et al., "Multi-label Iterated Learning for Image Classification with Label Ambiguity", arxiv.org, Computer Vision and Pattern Recognition, Artificial Intelligence, Machine Learning, Nov. 23, 2021, 14 pages.
Ankit Vani, et al, "Iterated Learning for Emergent Systematicity in VQA", arxiv.org, Cornell University Library, 201 Olin Library Cornell University Ithaca, NY 14853, May 3, 2021 (May 3, 2021), pp. 1-21.
Chen, Mark, et al, "Generative Pretraining from Pixels", Proceedings of the 37th International Conference On Machine Learning, [Online] Jul. 13, 2020 (Jul. 13, 2020), pp. 1-13.
Jiahui Yu, et al, "Vector-Quantized Image Modeling with Improved Vqgan", arxiv.org, Cornell University Library, 201 Olin Library Cornell University Ithaca, NY 14853, Jun. 5, 2022 (Jun. 5, 2022), pp. 1-17.
Patrick Esser, et al, "Taming Transformers for High-Resolution Image Synthesis", arxiv.org, Cornell University Library, 201 Olin Library Cornell University Ithaca, NY 14853, Feb. 11, 2021 (Feb. 11, 2021), pp. 1-37.
Yuchen Lu, et al, "Supervised Seeded Iterated Learning for Interactive Language Learning", arxiv.org, Cornell University Library, 201 Olin Library Cornell University Ithaca, NY 14853, Oct. 6, 2020 (Oct. 6, 2020), pp. 1-9.
Cao, C. et al., "The Image Local Autoregressive Transformer", Advances in Neural Information Processing Systems, 13 pages.

\* cited by examiner

IMAGE COMPONENT GENERATION BASED ON APPLICATION OF ITERATIVE LEARNING ON AUTOENCODER MODEL AND TRANSFORMER MODEL

CROSS-REFERENCE TO RELATED APPLICATIONS/INCORPORATION BY REFERENCE

This Application also makes reference to U.S. Provisional Application Ser. No. 63/368,264, which was filed on Jul. 13, 2022. The above stated Patent Applications are hereby incorporated herein by reference in their entirety

FIELD

Various embodiments of the disclosure relate to image processing. More specifically, various embodiments of the disclosure relate to an electronic device and method for image component generation based on application of iterative learning on autoencoder model and transformer model.

BACKGROUND

Advancements in the field of artificial intelligence (AI) have led to use of AI models in the field of image processing. It may be noted that human brain is a master in extracting and learning of compositional and abstract representations from sensory systems and rules to connect the representations. Such abilities allow humans to instantly adapt to novel situations. However, the property to instantly adapt to novel situations may be a critical feature missing from current AI models. The AI models may perform poorly when there is a distributional shift from training data. The search for fully compositional representations for images may be one of the unsolved problems in the fields of computer vision and machine learning to improve model generalizability and handle unseen scenarios. The notion of compositionality may be an established principle in the fields of linguistics and mathematical logic. The notion of compositionality may rely on the components as the building blocks of a whole, plus a set of rules on how to connect the components. In the domain of languages, compositionality may be associated with deduction of a meaning of a sentence based on meanings of constituent sub-words and rules or grammar used to combine the sub-words. However, the definition of the compositionality in an image domain may be more challenging as the image concepts may be intertwined in a high dimensional continuous space.

Limitations and disadvantages of conventional and traditional approaches will become apparent to one of skill in the art, through comparison of described systems with some aspects of the present disclosure, as set forth in the remainder of the present application and with reference to the drawings.

SUMMARY

An electronic device and method for image component generation based on application of iterative learning on autoencoder model and transformer model is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
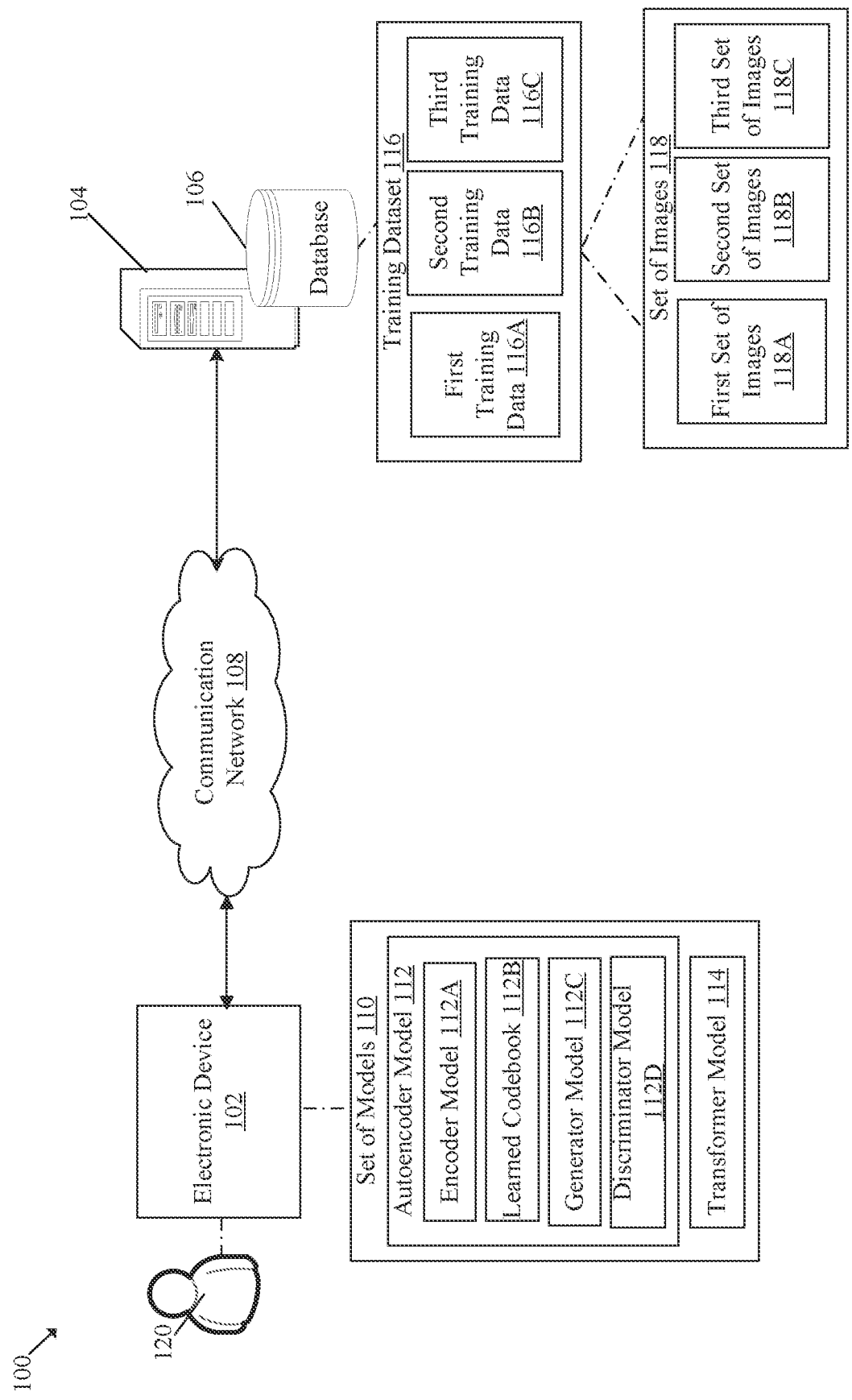
FIG. 1 is a block diagram that illustrates an exemplary network environment for image component generation based on an application of iterative learning on an autoencoder model and a transformer model, in accordance with an embodiment of the disclosure.

The following described implementation may be found in an electronic device and method for image component generation based on application of iterative learning on autoencoder model and transformer model. Exemplary aspects of the disclosure may provide an electronic device (for example, a server, a desktop, a laptop, or a personal computer) that may execute operations to generate image component based on application of iterative learning on autoencoder model and transformer model. The electronic device may fine-tune, based on first training data including a first set of images, an autoencoder model and a transformer model associated with the autoencoder model. The autoencoder model may include an encoder model, a learned codebook associated with the transformer model, a generator model, and a discriminator model. For example, the autoencoder model may correspond to a convolutional neural network (CNN) model based on a vector quantized generative adversarial network (VQGAN). The electronic device may select a subset of images from the first training data. The electronic device may apply the encoder model on the selected subset of images based on the learned codebook to determine encoded subset of images. The electronic device may generate second training data including a second set of images, based on the application of the encoder model. The generated second training data may correspond to a quantized latent representation of the selected subset of images. The electronic device may pre-train the autoencoder model to create a next generation of the autoencoder model, based on the generated second training data. In an example, the fine-tuning of the autoencoder model and the transformer model, and the pre-training of the autoencoder model may correspond to an iterative learning model (ILM).

The electronic device may further apply the transformer model to predict a sequence of tokens a sequence of tokens for each of the selected subset of images based on a start of the sequence of tokens. The electronic device may transform the predicted sequence of tokens to a quantized latent representation based on the learned codebook. The electronic device may apply the generator model on the quantized latent representation to generate a new synthetic image. The electronic device may generate third training data including a third image dataset corresponding to the generated new synthetic image. The electronic device may pre-train the transformer model to create a next generation of the transformer model, based on the generated third training data. In an example, the pre-training of the transformer model may also correspond to the ILM.

Typically, a human brain may be a master in extracting and learning of compositional and abstract representations from sensory systems and rules to connect the representations. Such abilities may allow humans to instantly adapt to novel situations. However, the property to instantly adapt to novel situations may be a critical feature missing from current AI models. The AI models may perform poorly when there is a distributional shift from training data. The search for fully compositional representations for images may be one of the unsolved problems in the fields of computer vision and machine learning to improve model generalizability and handle and/or manage unseen scenarios. Moreover, the definition of the compositionality in an image domain may be more challenging as the image concepts may be intertwined in a high dimensional continuous space.

In order to address the challenges related to image component generation; the present disclosure may find compositional representations for input images. The autoencoder model may adapt to downstream discriminative tasks faster and may generalize better. Further, an interpretability of codebook entries of the learned codebook may be improved. Hence, various properties of generated images, may be attributed to groups of similarly behaving codebook entries in the learned codebook. The transformer model of the present disclosure may be capable of memorization of training sequences. The application of ILM on the autoencoder model and on the transformer model may lead to data augmentation, which may help in generation of new generations of the autoencoder model and the transformer model. The autoencoder model and the transformer model may be adapted at each generation to perform better at the downstream tasks.

FIG. 1 is a block diagram that illustrates an exemplary network environment for image component generation based on an application of iterative learning on an autoencoder model and a transformer model, in accordance with an embodiment of the disclosure. With reference to FIG. 1, there is shown a network environment 100. The network environment 100 may include an electronic device 102, a server 104, a database 106, and a communication network 108. The electronic device 102 may be associated with a set of models 110. The set of models 110 may include an autoencoder model 112 and a transformer model 114. The autoencoder model 112 may include an encoder model 112A, a learned codebook 112B, a generator model 112C, and a discriminator model 112D. The database 106 may store a training dataset 116. The training dataset 116 may include first training data 116A, second training data 116B, and third training data 116C. The training dataset 116 may be associated with a set of images 118. The set of images 118 may include a first set of images 118A, a second set of images 118B, and a third set of images 118C. In FIG. 1, there is further shown a user 120, who may be associated with the electronic device 102.

The electronic device 102 may include suitable logic, circuitry, interfaces, and/or code that may be configured to fine-tune the autoencoder model 112 and the transformer model 114 associated with the autoencoder model 112, based on the first training data 116A (that may include the first set of images 118A). The electronic device 102 may select a subset of images from the first training data 116A. The electronic device 102 may apply the encoder model 112A on the selected subset of images based on the learned codebook 112B to determine an encoded subset of images. The electronic device 102 may generate the second training data 116B such as, the second training data 116B including the second set of images 118B, based on the application of the encoder model 112A. The generated second training data such as, the second training data 116B, may correspond to a quantized latent representation of the selected subset of images. The electronic device 102 may pre-train the autoencoder model 112 to create a next generation of the autoencoder model 112, based on the second training data such as, the second training data 116B (for example, the second set of images 118B). In an example, the fine-tuning of the autoencoder model 112 and the transformer model 114, and the pre-training of the autoencoder model 112 may correspond to an iterative learning model (ILM). In certain scenarios, the electronic device 102 may pre-train the transformer model 114 to create a next generation of the transformer model 114, based on the third training data such as, the third training data 116C (for example, the third set of images 118C). In such case, the pre-training of the transformer model may also correspond to the ILM. Examples of the electronic device 102 may include, but are not limited to, a computing device, a smartphone, a cellular phone, a mobile phone, a gaming device, a mainframe machine, a server, a computer workstation, and/or a consumer electronic (CE) device.

The server 104 may include suitable logic, circuitry, and interfaces, and/or code that may be configured to execute operations, such as, an operation for autoencoder model and transformer model fine-tuning, an operation for encoder model application, an operation for second training data generation, and an operation for autoencoder model pre-training. In certain scenarios, the operations may further include an operation for transformer model pre-training. In one or more embodiments, the server 104 may execute at least one operation associated with the electronic device 102. The server 104 may be implemented as a cloud server and may execute operations through web applications, cloud applications, HTTP requests, repository operations, file transfer, and the like. Other example implementations of the server 104 may include, but are not limited to, a database server, a file server, a web server, a media server, an application server, a mainframe server, or a cloud computing server.

In at least one embodiment, the server 104 may be implemented as a plurality of distributed cloud-based resources by use of several technologies that are well known to those ordinarily skilled in the art. A person with ordinary skill in the art will understand that the scope of the disclosure may not be limited to the implementation of the server 104 and the electronic device 102, as two separate entities. In certain embodiments, the functionalities of the server 104 can be incorporated in its entirety or at least partially in the electronic device 102 without a departure from the scope of the disclosure. In certain embodiments, the server 104 may host the database 106. Alternatively, the server 104 may be separate from the database 106 and may be communicatively coupled to the database 106.

The database 106 may include suitable logic, interfaces, and/or code that may be configured to store the training dataset 116 including the first training data 116A, the second training data 116B, and the third training data 116C. The database 106 may further store the set of images 118 such as, the first set of images 118A, the second set of images 118B, and the third set of images 118C. In an example, the first training data 116A may include the first set of images 118A, the second training data 116B may include the second set of images 118B, and the third training data 116C may include the third set of images 118A. The database 106 may be stored or cached on a device, such as a server (e.g., the server 104) or the electronic device 102. The device storing the database 106 may be configured to receive a query for the training dataset 116 including the set of images 118. In response, the device that stores the database 106 may retrieve and provide the training dataset 116 including the set of images 118 to the electronic device 102.

In some embodiments, the database 106 may be hosted on a plurality of servers stored at same or different locations. The operations of the database 106 may be executed using hardware, including a processor, a microprocessor (e.g., to perform or control performance of one or more operations), a field-programmable gate array (FPGA), or an application-specific integrated circuit (ASIC). In some other instances, the database 106 may be implemented using software.

The communication network 108 may include a communication medium through which the electronic device 102 and the server 104 may communicate with each other. The communication network 108 may be one of a wired connection or a wireless connection. Examples of the communication network 108 may include, but are not limited to, the Internet, a cloud network, Cellular or Wireless Mobile Network (such as, Long-Term Evolution and 5th Generation (5G) New Radio (NR)), a satellite network (such as, a network of a set of low-earth orbit satellites), a Wireless Fidelity (Wi-Fi) network, a Personal Area Network (PAN), a Local Area Network (LAN), or a Metropolitan Area Network (MAN). Various devices in the network environment 100 may be configured to connect to the communication network 108 in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The autoencoder model 112 may include the encoder model 112A, the learned codebook 112B, the generator model 112C, and the discriminator model 112D. Details related to the encoder model 112A, the learned codebook 112B, the generator model 112C, and the discriminator model 112D are provided herein.

The encoder model 112A may include suitable logic, interfaces, and/or code that may be configured to compress an image to produce a compressed representation of the image. The compressed representation may be obtained according to following expression (1):

$$\check{z} \in R^{h*w*d} \quad (1)$$

Herein, '$\check{z}$' may be the compressed representation of an image and 'R' may be a real number space. Further, 'h', 'w' and 'd' may represent a compressed height, a compressed width, and a number of channels respectively, for the image of resolution, say 'H'×'W', where 'H' may be the height of the image and 'W' may be the width of the image.

The learned codebook 112B may include suitable logic, interfaces, and/or code that may be configured to quantize the compressed representation of the image. The learned codebook 112B may be represented according to following expression (2):

$$Z \in R^{N*d} \quad (2)$$

where N may be a number of 'd' dimensional codebook of vectors. A quantization function q($\check{z}$) may be used replace each one of the 'd' dimensional vectors in a 'h×w' grid of a latent representation with a closest entry from the learned codebook 112B.

The generator model 112C may include suitable logic, interfaces, and/or code that may be configured to generate a reconstructed image from a sequence of tokens. Herein, each of the sequence of tokens may be mapped to a pixel value to obtain a set of pixel values. The set of pixel values may be associated with the reconstructed image.

The discriminator model 112D may include suitable logic, interfaces, and/or code that may be configured to determine whether the reconstructed image is real or fake. The discriminator model 112D may process the set of pixel values associated with the reconstructed image and determine whether the pixel value is real or fake. The discriminator model 112D may differentiate between real and fake reconstructed images The autoencoder model 112 may use the discriminator model 112D to improve the quality/accuracy of the reconstructed image determined by the generator model 112C.

The transformer model 114 may include suitable logic, interfaces, and/or code that may be configured to apply the transformer model 114 to predict a sequence of tokens for each of the selected subset of images, based on a start of the sequence of tokens to pre-train or fine-tune the transformer model 114. The prediction of the sequence of tokens for an image may be considered analogous to an assembly of words in sentences of a natural language. For example, in an embodiment, in case of pre-training or fine-tuning of the transformer model 114, the subset of images may be considered as language constructs, while entries of the learned codebook 112B may correspond to words of the language. Further, the transformer model 114 may correspond to a grammar of the language that may be used to make sentences in the language based on the assembly of the words in a certain sequence to pre-train or fine-tune the transformer model 114.

In an embodiment, the autoencoder model 112 and/or the transformer model 114 may be implemented using one or more neural network models. Each of the one or more neural network models may be a computational network or a system of artificial neurons, arranged in a plurality of layers, as nodes. The plurality of layers of the neural network model may include an input layer, one or more hidden layers, and an output layer. Each layer of the plurality of layers may include one or more nodes (or artificial neurons, represented by circles, for example). Outputs of all nodes in the input layer may be coupled to at least one node of hidden layer(s). Similarly, inputs of each hidden layer may be coupled to outputs of at least one node in other layers of the neural network model. Outputs of each hidden layer may be coupled to inputs of at least one node in other layers of the neural network model. Node(s) in the final layer may receive inputs from at least one hidden layer to output a result. The number of layers and the number of nodes in each layer may be determined from hyper-parameters of the neural network model. Such hyper-parameters may be set before, while training, or after training the neural network model on a training dataset (e.g., the training dataset 116).

Each node of the neural network model may correspond to a mathematical function (e.g., a sigmoid function or a rectified linear unit) with a set of parameters, tunable during training of the neural network model. The set of parameters may include, for example, a weight parameter, a regularization parameter, and the like. Each node may use the mathematical function to compute an output based on one or more inputs from nodes in other layer(s) (e.g., previous layer(s)) of the neural network model. All or some of the nodes of the neural network model may correspond to same or a different same mathematical function.

In training of the neural network model, one or more parameters of each node of the neural network model may be updated based on whether an output of the final layer for a given input (from the training dataset 116) matches a correct result based on a loss function for the neural network model. The above process may be repeated for same or a different input until a minima of loss function may be achieved, and a training error may be minimized. Several methods for training are known in art, for example, gradient descent, stochastic gradient descent, batch gradient descent, gradient boost, meta-heuristics, and the like.

The neural network model may include electronic data, which may be implemented as, for example, a software component of an application executable on the electronic device 102 and/or the server 104. The neural network model may rely on libraries, external scripts, or other logic/instructions for execution by a computing device, such as, circuitry (e.g., circuitry 202 of FIG. 2) of the electronic device 102. The neural network model may include code and routines configured to enable the computing device, such as, the circuitry 202 of FIG. 2 to perform one or more operations for image component generation based on application of iterative learning. Additionally, or alternatively, the neural network model may be implemented using hardware including a processor, a microprocessor (e.g., to perform or control performance of one or more operations), a field-programmable gate array (FPGA), or an application-specific integrated circuit (ASIC). Alternatively, in some embodiments, the neural network model may be implemented using a combination of hardware and software. Examples of the neural network model may include, but are not limited to, an encoder network model, a decoder network model, a transformer network model, a deep learning model, a convolution neural network model, a deep Bayesian neural network model, or a Generative Adversarial Network (GAN) model.

The training dataset 116 may include the first training data 116A, the second training data 116B, and the third training data 116C. Each training data of the training dataset 116 may be associated with the set of images 118. For example, the first training data 116A may include the first set of images 118A, the second training data 116B may include the second set of images 118B, and the third training data 116C may include the third set of images 118C. The training dataset 116 may be used to train the set of models 110. For example, the first training data 116A including the first set of images 118A may be used to fine-tune the autoencoder model 112 and the transformer model 114 associated with the autoencoder model 112.

In operation, the electronic device 102 may be configured to fine-tune, based on the first training data 116A including the first set of images 118A, the autoencoder model 112 and the transformer model 114 associated with the autoencoder model 112. The autoencoder model 112 may include the encoder model 112A, the learned codebook 112B associated with the transformer model 114, the generator model 112C, and the discriminator model 112D. The autoencoder model 112 and the transformer model 114 may be fine-tuned based on the first training data 116A in order to improve an accuracy of the autoencoder model 112 and the transformer model 114. Details related to the fine-tuning and the autoencoder model 112 are further provided, for example, in FIG. 4 (at 402).

The electronic device 102 may be configured to select the subset of images from the first training data 116A. The circuitry 202 may randomly select the subset of images from the first set of images 118A. Details related to the subset of images selection are further provided, for example, in FIG. 4 (at 404).

The electronic device 102 may be configured to apply the encoder model 112A on the selected subset of images based on the learned codebook 112B to determine encoded subset of images. To determine the encoded subset of images, each image of the selected subset of images may be fed to the encoder model 112A. The encoder model 112A may compress each image of the selected subset of images and may encode each image of the selected subset of images. Details related to the encoding of subset of images are further provided, for example, in FIG. 4 (at 406).

The electronic device 102 may be configured to generate the second training data 116B including the second set of images 118B, based on the application of the encoder model 112A. The generated second training data 116B may correspond to the quantized latent representation of the selected subset of images. The second training data 116B may include the selected subset of images and quantized latent representation of each of the selected subset of images. Thus, the second training data 116B may be used to transfer information related to mapping of images to a quantized latent space. Details related to the second training data are further provided, for example, in FIG. 4 (at 408).

The electronic device 102 may be configured to pre-train the autoencoder model 112 to create the next generation of the autoencoder model 112, based on the generated second training data 116B. The pre-training of the autoencoder model 112 may pre-train the encoder model 112A, update the learned codebook 112B, pre-train the generator model 112C, and also pre-train the discriminator model 112D. Details related to the pre-training of the autoencoder model 112 are further provided, for example, in FIG. 4 (at 410).

In an embodiment, the electronic device 102 may be configured to apply the transformer model 114 for generating a new image (for example, a new synthetic image). The transformer model 114 may be used to predict a sequence of tokens based on the start of sequence tokens for each new image. Details related to the determination of the sequence of tokens are further provided, for example, in FIG. 5 (at 502).

Figure 5:
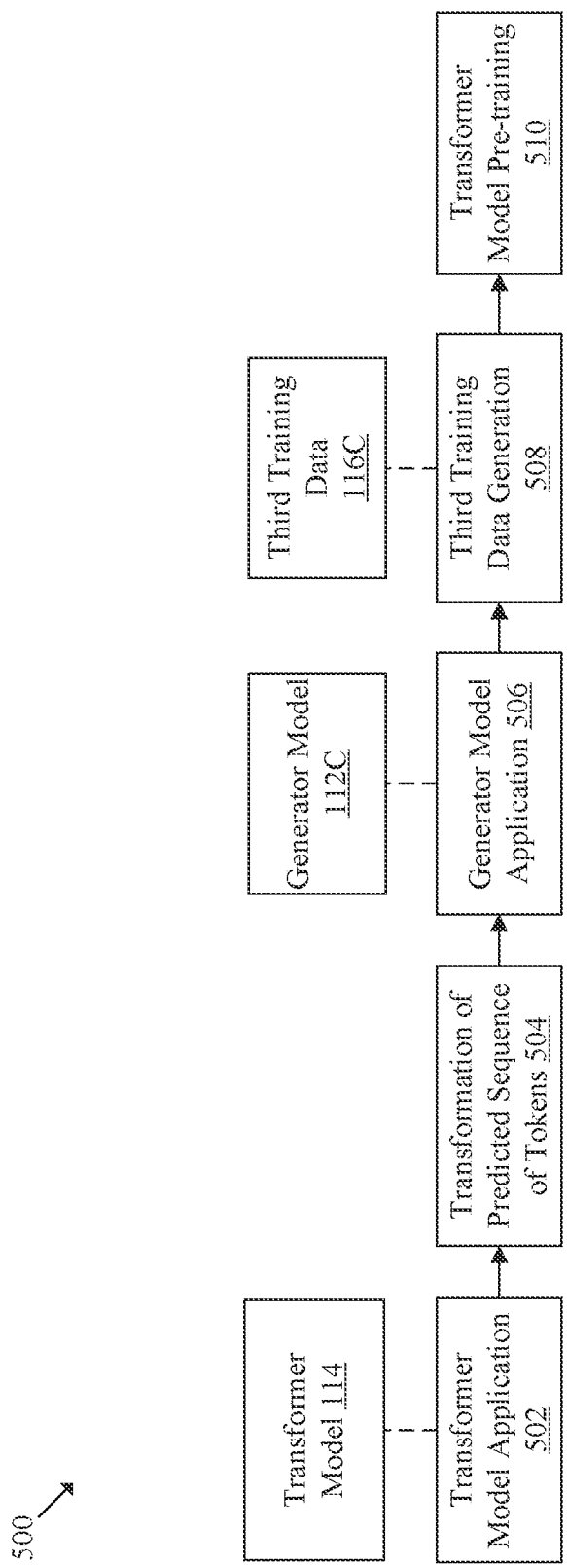
FIG. 5 is a diagram that illustrates an exemplary processing pipeline for pre-training a transformer model, in accordance with an embodiment of the disclosure.

The electronic device 102 may be configured to transform the predicted sequence of tokens to a quantized latent representation (denoted by "Zq") based on the learned codebook 112B, Details related to the transformation of the predicted sequence to quantized latent representation are further provided, for example in FIG. 5 (at 504)

The electronic device 102 may be configured to apply the generator model 112C on the quantized latent representation to generate a new synthetic image. The generator model 112C may generate the new synthetic image based on the quantized latent representation. The sequence of tokens may be predicted based on the application of the transformer model 114. In other words, the generator model 112C may generate the new synthetic image based on the sequence of tokens that may be predicted by the transformer model 114. The generator model 112C may generate the third training data 116C corresponding to the sequence of tokens. Details related to the generator model application are further provided, for example, in FIG. 5 (at 506).

The electronic device 102 may be configured to generate the third training data 116C including the third set of images 118C corresponding to the generated new synthetic image. Details related to the third training data generation are further provided, for example, in FIG. 5 (at 508).

The electronic device 102 may be configured to pre-train the transformer model 114 to create the next generation of the transformer model 114 based on the generated third training data 116C. The next generation of the transformer model 114 may be a new transformer model ($T_n$) that may be pre-trained on the generated third training data 116C by using the previous generation autoencoder components (such as, the previous generation encoder model 112A, the previous generation learned codebook 112B, and the previous generation generator model 112C). Details related to the pre-training of the transformer model are further provided, for example, in FIG. 5 (at 510).

In an embodiment, the electronic device 102 may be configured to fine-tune, based on the first training data 116A including the first set of images 118A, the autoencoder model 112, wherein the autoencoder model 112 may include the encoder model 112A, the learned codebook 112B associated with the transformer model 114, the generator model 112C, and the discriminator model 112D. Details related to the fine-tuning of the autoencoder model 112 are further provided, for example, in FIG. 6A.

The electronic device 102 may be configured to apply the encoder model 112A on the first set of images 118A based on the learned codebook 112B to determine encoded first set of images, wherein the encoded first set of images may correspond to a quantized latent representation of the first set of images 118A. Details related to the application of the encoder model 112A are further provided, for example, in FIG. 6A.

The electronic device 102 may be configured to generate the second training data 116B including the second image dataset based on a subset of images from the first training data 116A and the quantized latent representation of the subset of images. Details related to the generation of the second training data 116B are further provided, for example, in FIG. 6A.

The electronic device 102 may be configured to pre-train the autoencoder model 112 to create a next generation of the autoencoder model 112, based on the generated second training data 116B. Details related to the pre-training of the autoencoder model 112 are further provided, for example, in FIG. 6A.

The electronic device 102 may be configured to fine-tune the transformer model 114 based on the last generation of autoencoder model 112. Details related to the fine-tuning of the transformer model 114 are further provided, for example, in FIG. 6A. Details related to the fine-tuning of the transformer model 114 are further provided, for example, in FIG. 6A.

In an embodiment, the electronic device 102 may be configured to fine-tune, based on first training data 116A including the first set of images 118A, the autoencoder model 112 and the transformer model 114 associated with the autoencoder model 112, wherein the autoencoder model 112 includes the encoder model 112A, the learned codebook 112B associated with the transformer model 114, the generator model 112C, and the discriminator model 112D. Details related to the fine-tuning of the autoencoder model 112 and the transformer model 114 are further provided, for example, in FIG. 6B.

The electronic device 102 may be configured to select a subset of images from the first training data 116A. Details related to the subset of images are further provided, for example, in FIG. 6B.

The electronic device 102 may be configured to apply the transformer model 114 to predict a sequence of tokens for each of the new synthetic images based on a start of sequence of token. Details related to the prediction of the sequence of tokens are further provided, for example, in FIG. 6B.

The electronic device 102 may be configured to transform the predicted sequence of tokens to a quantized latent representation based on the learned codebook 112B. Details related to the transformation of the predicted sequence of tokens are further provided, for example, in FIG. 6B.

The electronic device 102 may be configured to apply the generator model 112C on the quantized latent representation to generate a new synthetic image. Details related to the application of the generator model 112C are further provided, for example, in FIG. 6B.

The electronic device 102 may be configured to generate third training data 116C including the third set of images 118C corresponding to the generated new synthetic image. Details related to the generation of the third training data 116C are further provided, for example, in FIG. 6B.

The electronic device 102 may be configured to pre-train the transformer model 114 to create a next generation of the transformer model 114, based on the generated third training data 116C. Details related to the pre-training of the transformer model 114 are further provided, for example, in FIG. 6B.

The electronic device 102 of the disclosure may generate image components based on an application of an iterative learning model (ILM) on the autoencoder model 112 and transformer model 114 effectively. The electronic device 102 may find compositional representations for input images based on the application of the ILM. The autoencoder model 112 may adapt to downstream discriminative tasks faster and may generalize better. Further, an interpretability of codebook entries of the learned codebook 112B may be improved. Hence, various properties of the generated images, may be attributed to groups of similarly behaving codebook entries. The transformer model 114 of the present disclosure may be capable in memorization of training sequences. The application of ILM on the transformer model 114 may act as a data augmentation method and improve the accuracy of the transformer model 114 over each generation of training of the transformer model 114.

Figure 2:
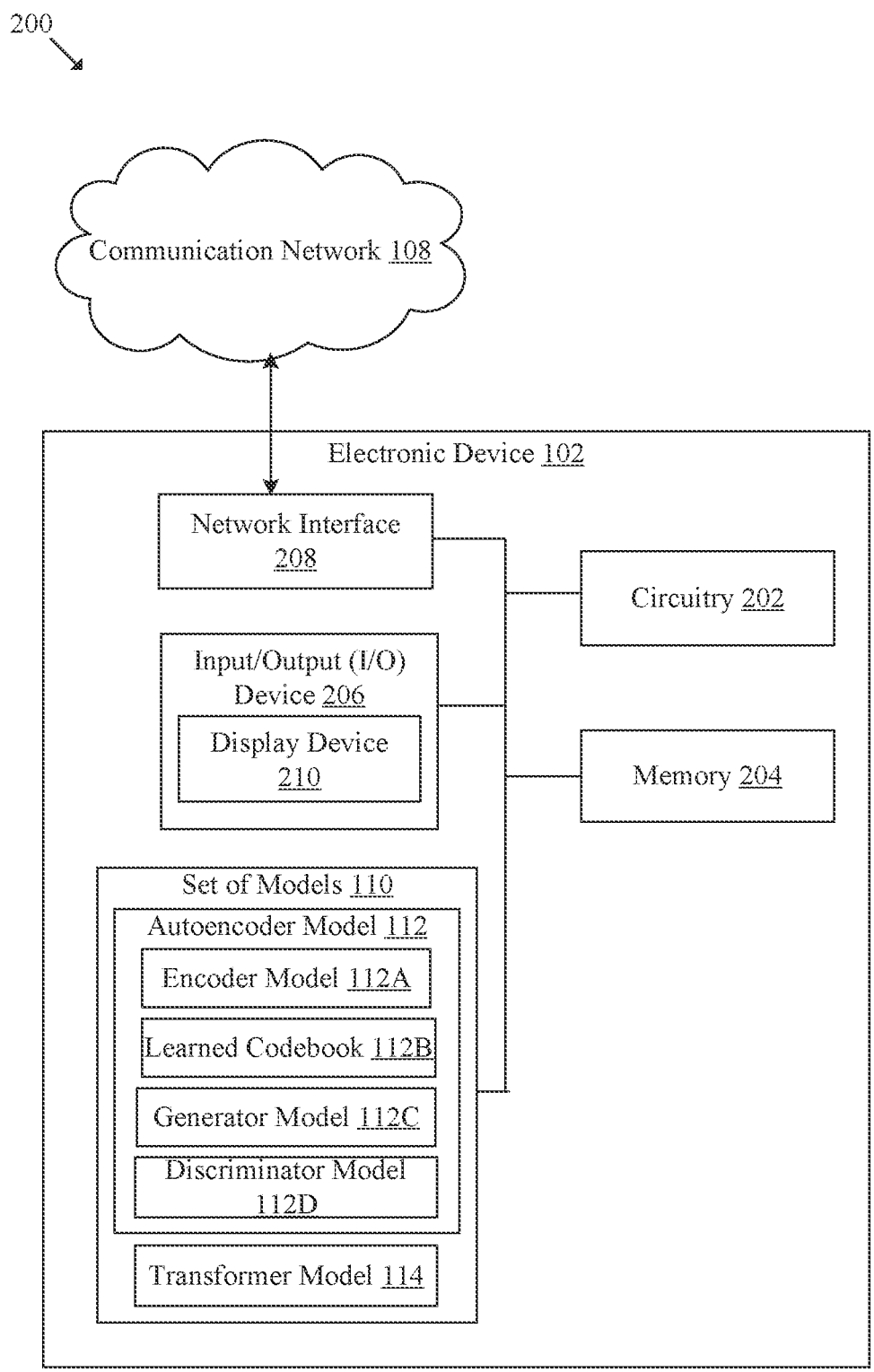
FIG. 2 is a block diagram that illustrates an exemplary electronic device of FIG. 1, in accordance with an embodiment of the disclosure.

FIG. 2 is a block diagram that illustrates an exemplary electronic device of FIG. 1, in accordance with an embodiment of the disclosure. FIG. 2 is explained in conjunction with elements from FIG. 1. With reference to FIG. 2, there is shown the electronic device 102. The electronic device 102 may include circuitry 202, a memory 204, an input/output (I/O) device 206, and a network interface 208. The input/output (I/O) device 206 may include a display device 210. The electronic device 102 may further include the set of models 110 including the autoencoder model 112 and the transformer model 114. The autoencoder model 112 may include the encoder model 112A, the learned codebook 112B, the generator model 112C, and the discriminator model 112D. The learned codebook 1128 may be associated with the transformer model 114.

The circuitry 202 may include suitable logic, circuitry, and/or interfaces that may be configured to execute program instructions associated with different operations to be executed by the electronic device 102. The circuitry 202 may be configured to fine-tune the autoencoder model 112 and the transformer model 114. The circuitry 202 may be configured to select the subset of images from the first training data 116A. The circuitry 202 may be configured to apply the encoder model 112A on the selected subset of images. The circuitry 202 may be configured to generate the second training data 1168. The circuitry 202 may be configured to pre-train the autoencoder model 112. The circuitry 202 may be further configured to pre-train the transformer model 114. The circuitry 202 may include one or more processing units, which may be implemented as a separate processor. In an embodiment, the one or more processing units may be implemented as an integrated processor or a cluster of processors that perform the functions of the one or more specialized processing units, collectively. The circuitry 202 may be implemented based on a number of processor technologies known in the art. Examples of implementations of the circuitry 202 may be an X86-based processor, a Graphics Processing Unit (GPU), a Reduced Instruction Set Computing (RISC) processor, an Application-Specific Integrated Circuit (ASIC) processor, a Complex Instruction Set Computing (CISC) processor, a microcontroller, a central processing unit (CPU), and/or other control circuits.

The memory 204 may include suitable logic, circuitry, interfaces, and/or code that may be configured to store one or more instructions to be executed by the circuitry 202. The memory 204 may be configured to store the set of models 110 and the training dataset 116 (including the set of images 118). Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 206 may include suitable logic, circuitry, interfaces, and/or code that may be configured to receive an input and provide an output based on the received input. For example, the I/O device 206 may receive a first user input corresponding to the first training data 116A. The I/O device 206 may further receive a second user input indicative of an instruction to pre-train at least one of the autoencoder model 112 or the transformer model 114. The I/O device 206 may be further configured to display at least one of the first set of images 118A included in the first training data 116A, the second set of images 118B included in the second training data 1168, or the third set of images 118C included in the third training data 116C. The I/O device 206 may include the display device 210. Examples of the I/O device 206 may include, but are not limited to, a touch screen, a display device (e.g., the display device 210), a keyboard, a mouse, a joystick, a microphone, or a speaker.

The network interface 208 may include suitable logic, circuitry, interfaces, and/or code that may be configured to facilitate communication between the electronic device 102 and the server 104 via the communication network 108. The network interface 208 may be implemented by use of various known technologies to support wired or wireless communication of the electronic device 102 with the communication network. The network interface 208 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry.

The network interface 208 may be configured to communicate via wireless communication with networks, such as the Internet, an Intranet, a wireless network, a cellular telephone network, a wireless local area network (LAN), or a metropolitan area network (MAN). The wireless communication may be configured to use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), 5th Generation (5G) New Radio (NR), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The display device 210 may include suitable logic, circuitry, and interfaces that may be configured to display the first set of images 118A, the second set of images 118B, and/or the third set of images 118C. The display device 210 may be a touch screen which may enable a user (e.g., the user 120) to provide a user-input via the display device 210. The touch screen may be at least one of a resistive touch screen, a capacitive touch screen, or a thermal touch screen. The display device 210 may be realized through several known technologies such as, but not limited to, at least one of a Liquid Crystal Display (LCD) display, a Light Emitting Diode (LED) display, a plasma display, or an Organic LED (OLED) display technology, or other display devices. In accordance with an embodiment, the display device 210 may refer to a display screen of a head mounted device (HMD), a smart-glass device, a see-through display, a projection-based display, an electro-chromic display, or a transparent display. Various operations of the circuitry 202 for image component generation based on application of iterative learning on autoencoder model and transformer model are described further, for example, in FIG. 3.

Figure 3:
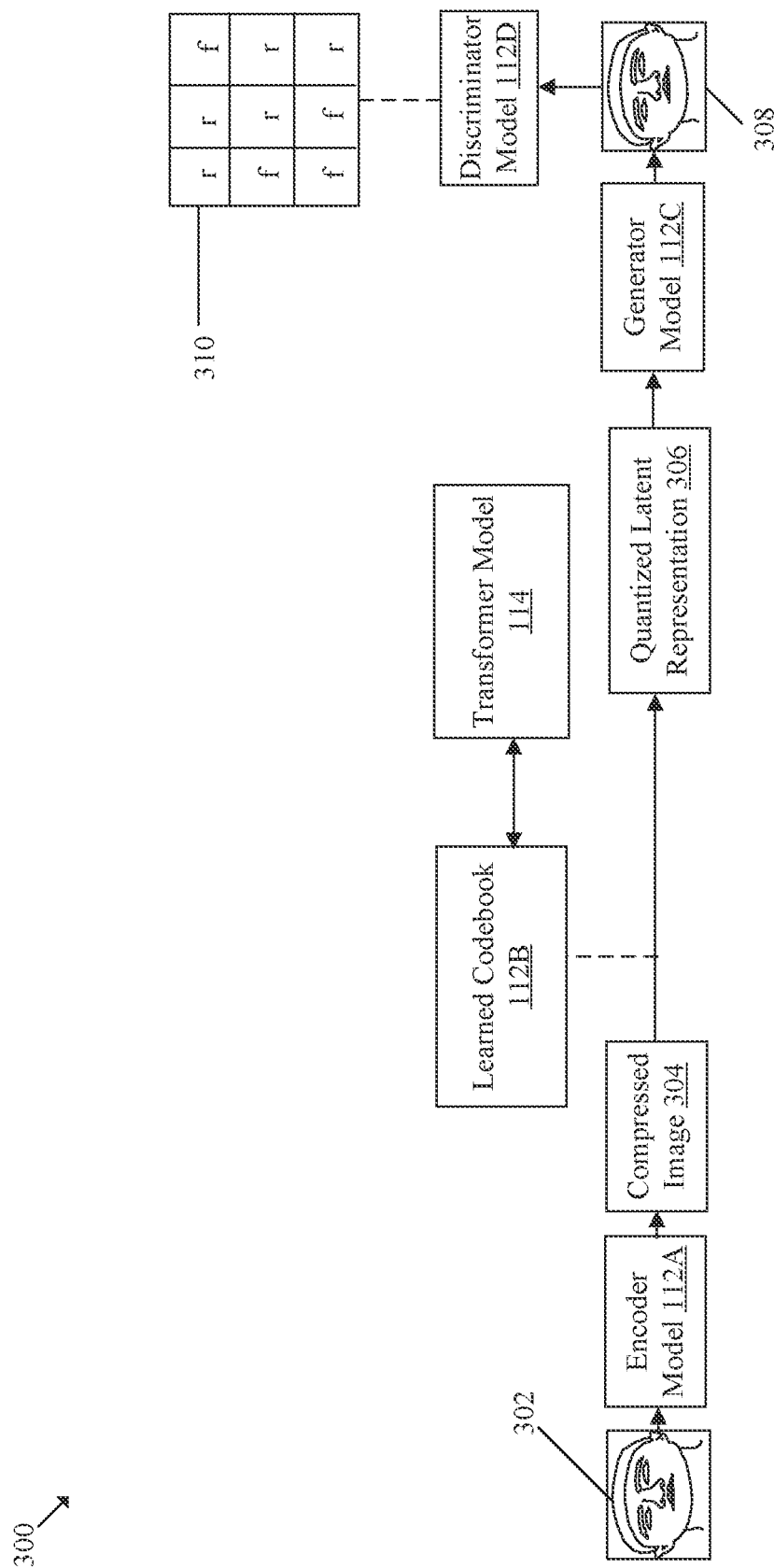
FIG. 3 is a diagram that illustrates an exemplary of a vector quantized generative adversarial network (VQGAN), in accordance with an embodiment of the disclosure.

FIG. 3 is a diagram that illustrates an exemplary scenario of a vector quantized generative adversarial network (VQ-GAN), in accordance with an embodiment of the disclosure. FIG. 3 is described in conjunction with elements from FIG. 1 and FIG. 2. With reference to FIG. 3, there is shown an exemplary scenario 300. The scenario 300 may include an image 302, the encoder model 112A, a compressed image 304, a quantized latent representation 306, the generator model 112C, a reconstructed image 308, the discriminator model 112D, the learned codebook 1128, the transformer model 114, and a discriminator output 310. A set of operations associated the scenario 300 is described herein. It should be noted that the scenario 300 of FIG. 3 is for exemplary purposes and should not be construed to limit the scope of the disclosure.

It may be observed that a VQGAN for image generation may be a density estimation model. For example, in case of the VQGAN for image generation, the image 302 may be passed through the encoder model 112A. The encoder model 112A may compress the image 302. In an example, the resolution of the image 302 may correspond to an 'H' height and a 'W' width. Herein, the image 302 may be compressed such that the compressed height may be 'h', the compressed width may be 'w', and the number of channels may be 'd' for the compressed image 304. The compressed image 304 may be quantized using the learned codebook 1128. As discussed, from the expression (2), the quantization function $q(\tilde{x})$ associated with the learned codebook 1128 may replace each one of the 'd' dimensional vectors in a 'h×w' grid of the latent representation with the closest entry from learned codebook 1128 to obtain the quantized latent representation ("$z_q$") 306. The quantized latent representation 306 may be fed to the generator model 112C. The generator model 112C may reconstruct an image based on the quantized latent representation 306 to obtain the reconstructed image 308. The reconstructed image 308 may be provided as an input to the discriminator model 112D that may provide the discriminator output 310. The discriminator output 310 may analyze whether the generated image 308 is real of fake.

In an embodiment, the fine-tuning of the autoencoder model 112 and the transformer model 114, and the pre-training of the autoencoder model 112 may correspond to an iterative learning model (ILM). The Iterative Learning Model (ILM) may be a cognitive science-based learning model that may be focused on human natural languages. According to the iterative learning model, an evolution of natural language may be considered as an adaptive learning process that may prioritize language reproduction to other aspects of language. For example, if a language is to survive going through generations (for example, from parents to children), the language may be required to be structure preserving. The structure preserving attribute of a language may encourage compositionality and regularity in the language, which may ease the reproduction of the language despite passing through a bottleneck between generations (for example, to children's' mind). Learning the components of a language significantly may improve a human ability to generalize to unfamiliar and novel sentences and even understand nonsensical sentences. The ILM may have four components, namely, a meaning space, a signal space, at least one learning agent, and at least one adult agent. The meaning space may be a set of concepts that the language may be supposed to convey. The signal space may be a set of possible symbols that may be used to represent concepts. For instance, a string of characters from letter a to z with no constraint on the length of strings may represent the signal space in English language. Each ILM agent may be a mechanism, an algorithm, or a technique to generate signals for meanings. The mechanism may produce a signal for each meaning. The algorithm may be a mapping from the meaning space to the signal space. The algorithm may induce the representation given pairs of (meaning, signals). An adult agent may generate signals for a subset of meaning space. The subset of meanings and signals may be used to build training data for a next learning generation. Each generation may try to fill a gap of information of limited training data. The process of training may continue across generations.

Figure 4:
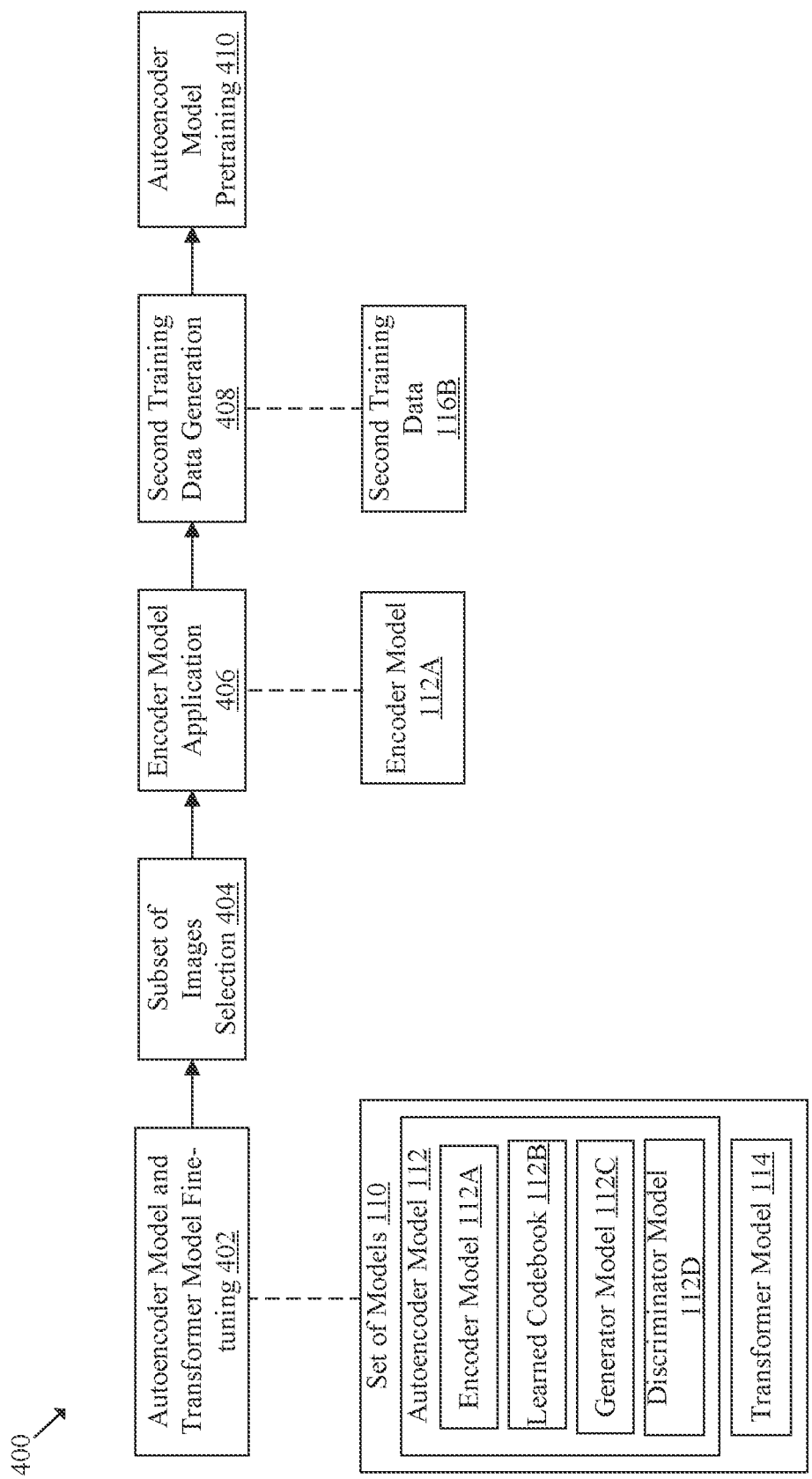
FIG. 4 is a diagram that illustrates an exemplary processing pipeline for image component generation based on an application of iterative learning on an autoencoder model and a transformer model, in accordance with an embodiment of the disclosure.

FIG. 4 is a diagram that illustrates an exemplary processing pipeline for image component generation based on an application of iterative learning on an autoencoder model and a transformer model, in accordance with an embodiment of the disclosure. FIG. 4 is explained in conjunction with elements from FIG. 1, FIG. 2, and FIG. 3. With reference to FIG. 4, there is shown an exemplary processing pipeline 400 that illustrates exemplary operations from 402 to 410. The exemplary operations 402 to 410 may be executed by any computing system, for example, by the electronic device 102 of FIG. 1 or by the circuitry 202 of FIG. 2. The exemplary processing pipeline 400 further illustrates the set of models 110. The set of models 110 may include the autoencoder model 112 and the transformer model 114. The autoencoder model 112 may include the encoder model 112A, the learned codebook 1128, the generator model 112C, and the discriminator model 112D.

At 402, an operation for autoencoder model and transformer model fine-tuning may be executed. In an embodiment, the circuitry 202 may be configured to fine-tune, based on first training data 116A including the first set of images 118A, the autoencoder model 112 and the transformer model 114 associated with the autoencoder model 112. The autoencoder model 112 may include the encoder model 112A, the learned codebook 1128 associated with the transformer model 114, the generator model 112C, and the discriminator model 112D. It may be appreciated that fine-tuning of a pre-trained machine learning (ML) model may adapt the pre-trained ML model (that may have been pre-trained for a certain task) to be tweaked such that the ML model may perform another task. Further, the fine-tuning of the pre-trained ML model may enhance the accuracy of the ML model. It may be noted that the autoencoder model 112 and the transformer model 114 may be also ML models. Thus, the autoencoder model 112 and the transformer model 114 may be fine-tuned based on the first training data 116A.

In an embodiment, the autoencoder model 112 may correspond to a convolutional neural network (CNN) model based on a vector quantized generative adversarial network (VQGAN). It may be appreciated the CNN model may be a class of deep learning networks that may be used for applications associated with images. The CNN model may include one or more CNN layers followed by fully connected layers. The CNN model may be shift invariant and space invariant, hence may be used for downstream tasks, such as, image classifications, natural language processing, and the like. The vector quantized generative adversarial network may be a type of generative adversarial network model, which may include two neural network models, such as, the generator model 112C and the discriminator model 112D. The generator model 112C and the discriminator model 112D of the generative adversarial network model may compete against each other to become more accurate. The vector quantized generative adversarial network may be used to make variations in a dataset (such as the first training data 116A). Based on the variations, the dataset (such as, the first training data 116A) may be augmented. In an embodiment, both the generator model 112C and the discriminator model 112D may be trained separately. Thereafter, the generator model 112C may be fed with the quantized latent representation 306 (e.g., a sequence of symbols) of FIG. 3. The generator model 112C may then generate an output such as, the generated image 308 of FIG. 3. Further, an actual sample or a ground truth, such as the image 302 of FIG. 3, may be used to train the discriminator model 112D. The output of the generator model 112C may be then fed to the discriminator model 112D. The discriminator model 112D may determine whether the output of the generator model 112C is similar to the actual sample. In other words, the discriminator model 112D may determine whether the generated image 308 is a fake image (which may be differentiable from the actual sample) or a real image (which may be similar to the actual sample). In an example, the discriminator model 112D may provide a binary output '1' when the output of the generator model 112C is similar to the actual sample and a binary output '0' when the output of the generator model 112C is not similar to the actual sample.

At 404, an operation for selection of the subset of images from the first training data may be executed. In an embodiment, the circuitry 202 may be configured to select the subset of images from the first training data 116A. As discussed, the first training data 116A may include the first set of images 118A. The circuitry 202 may randomly select the subset of images from the first set of images 118A. For example, out of 1000 images in the first set of images 118A, the circuitry 202 may randomly select 100 images as the subset of images.

At 406, an operation for the encoder model application may be executed. The circuitry 202 may be configured to apply the encoder model 112A on the selected subset of images based on the learned codebook 1128 to determine the encoded subset of images. Each image of the selected subset of images may be passed to the encoder model 112A. The encoder model 112A may compress each image of the selected subset of images and may encode each image of the selected subset of images. For example, pixels of each image of the selected subset of images may be assigned a meaning and encoded based on the learned codebook 1128. In an embodiment, the encoded subset of images may correspond to the quantized latent representation.

At 408, an operation for second training data generation may be executed. In an embodiment, the circuitry 202 may be configured to generate the second training data 1168 including the second set of images 1188, based on the application of the encoder model 112A. The generated second training data 1168 may correspond to the quantized latent representation of the selected subset of images. The second training data 1168 may include the selected subset of images and the quantized latent representation of each of the selected subset of images. Thus, the second training data 1168 may be used to transfer information related to mapping of images to the quantized latent. The second training data 1168 may be represented by an expression (3), as follows:

$$D''_n = \{(x, z_{qn-1}) | x \in D_r, z_{qn-1} = E_{n-1}(x)\} \quad (3)$$

where, "$D''_n$" may be the second training data 116B, "x" may be the selected subset of images, "$z_{qn-1}$" may be the quantized latent representation of the selected subset of images, "$D_r$" may be the first training data 116A, and "$E_{n-1}(x)$" may be the encoder model 112A. Herein, "$E_{n-1}(x)$" may correspond to a previous generation of the encoder model 112A.

In an embodiment, the circuitry 202 may be further configured to map the selected subset of images from an image space to a signal space, based on an application of the encoder model 112A on the selected subset of images. The image space may be considered as the meaning space that may contain concepts of an image that a user may wish to convey. The signal space may be sequence of tokens or indices that may represent the image. Each of the selected subset of images may be mapped from the image space to the signal space.

In an embodiment, the signal space may correspond to the learned codebook 1128. For example, a string of characters from letter a to z with no constraint on the length of strings may represent the signal space in a language domain. In another example, a set of alphanumeric characters may represent the signal space in a mathematical logic domain.

In an embodiment, the quantized latent representation of the selected subset of images may be determined based on a replacement of each vector, of a set of multi-dimensional code vectors associated with the selected subset of images, with a closest entry from the learned codebook 1128. In an example, each image of the selected subset of images may have an "n×m" resolution, where "n" may be a number of rows and "m" may be a number of columns. Each vector may correspond to a row of an image. Thus, pixel values of each row may be substituted with the closest entry from the learned codebook 1128, such as, but not limited to, a string of characters from letter a to z with no constraint on the length of strings, or a set of alphanumeric characters, and the like.

At 410, an operation for autoencoder model pre-training may be executed. In an embodiment, the circuitry 202 may be configured to pre-train the autoencoder model 112 to create the next generation of the autoencoder model 112, based on the generated second training data 116B. The pre-training of the autoencoder model 112 may correspond to the pre-training of the encoder model 112A, the update of the learned codebook 1128, the pre-training of the generator model 112C, and the pre-training of the discriminator model 112D. It may be appreciated that the pre-training of the autoencoder model 112 may re-train the autoencoder model 112 based on the generated second training data 1168, to obtain the next generation of the autoencoder model 112.

In an embodiment, the circuitry 202 may be further configured to determine a first loss function associated with the encoder model 112A, the learned codebook 1128, and the generator model 112C. The circuitry 202 may be further configured to determine a second loss function associated with the autoencoder model 112. The circuitry 202 may be further configured to determine a third loss function associated with the encoder model 112A. The pre-training of the autoencoder model 112 may be further based on the determined first loss function, the determined second loss function, and the determined third loss function. It may be noted that the encoder model 112A, the generator model 112C, and the discriminator model 112D may be initialized randomly and may be pre-trained based on an optimization of an objective function as per expression (4), as follows:

$$Q_{ILM} = \arg\min_{E,Z,G}\max_{D} E_{xP(x)}[\mathcal{L}_{VQ}(E_n, Z_n, G_n) + \tag{4}$$

$$\lambda \mathcal{L}_{GAN}(E_n, Z_n, G_n, D_n) + \gamma \mathcal{L}_{ILM}(E_n)]$$

where, "$Q_{ILM}$" may be the objective function, "$\mathcal{L}_{VQ}$" may be the first loss function, "$\mathcal{L}_{GAN}$" may be the second loss function, "$\mathcal{L}_{ILM}$" may be the third loss function, "$E_n$" may be the encoder model 112A, "$Z_n$" may be the learned codebook 112B, "$G_n$" may be the generator model 112C, and "$\lambda$" may be a hyper-parameter that may control the contribution of the second loss function "$\mathcal{L}_{GAN}$" on the objective function "$Q_{ILM}$". Similarly, "$\gamma$" may be a hyper-parameter that may control the contribution of the third loss function "$\mathcal{L}_{ILM}$" on the objective function "$Q_{ILM}$".

In an embodiment, the determination of the third loss function may be based on a second norm, associated with the encoder model 112A of the next generation of the autoencoder model 112, with respect to the learned codebook 112B. The third loss function may be determined according to an expression (5), as follows:

$$\mathcal{L}_{ILM}(E_n) = \|E_n(x) - Z_{q_{n-1}}\|_2^2 \tag{5}$$

where, "$E_n(x)$" may be the next generation encoder model 112A and "$z_{q_{n-1}}$" may be the previous generation learned codebook 112B.

In an embodiment, the fine-tuning of the autoencoder model 112 and the transformer model 114, and the pre-training of the autoencoder model 112 may correspond to an iterative learning model (ILM). It should be noted that, in an embodiment, for the image component generation process, the circuitry 202 may be further configured to pre-train the transformer model 114. An exemplary processing pipeline for the pre-training of the transformer model 114 is described further, for example, in FIG. 5.

FIG. 5 is a diagram that illustrates an exemplary processing pipeline for pre-training a transformer model, in accordance with an embodiment of the disclosure. FIG. is explained in conjunction with elements from FIG. 1, FIG. 2, FIG. 3, and FIG. 4. With reference to FIG. 5, there is shown an exemplary processing pipeline 500 that illustrates exemplary operations from 502 to 510 for pre-training the transformer model 114. The exemplary operations 502 to 510 may be executed by any computing system, for example, by the electronic device 102 of FIG. 1 or by the circuitry 202 of FIG. 2. The exemplary processing pipeline 500 further illustrates the transformer model 114.

At 502, an operation for the transformer model application may be executed. In an embodiment, the circuitry 202 may be configured to apply the transformer model 114 to predict a sequence of tokens ("S") for each of the new synthetic images based on a start of the sequence of tokens. For example, the transformer model 114 may be used to determine a joint distribution of tokens, based on a prior distribution of the tokens, as per expression (6), as follows:

$$p(S) = \Pi_{i=1}^{h*w} p(S_i | S_{\{0,\ldots,i-1\}}) \tag{6}$$

where, "$p(S)$" may be a joint distribution of tokens, "$S_i$" may be an "$i^{th}$" token, and "h×w" may correspond to the dimensions of the grid associated with the latent representation. In an embodiment, prior to the application of the transformer model 114, to predict the sequence of tokens, the circuitry 202 may execute operations 402 to 410 of FIG. 4.

At 504, an operation for the transformation of the predicted sequence of tokens may be executed. In an embodiment, the circuitry 202 may be configured to transform the predicted sequence of tokens known as sequence of indices ("S") to a quantized latent representation ("Zq") based on the learned codebook 112B. In an embodiment, the predicted sequence of tokens may correspond to the sequence of indices from the learned codebook 112B. Indices may be elements of the learned codebook 112B that may be used to quantize the compressed representation of the image. For example, pixel values of the image may be encoded by the encoder model 112A and correlated with corresponding indices from the learned codebook 112B to obtain the quantized latent representation of the image. Indices corresponding to the encoded pixel values may be arranged in the form of a sequence to obtain the sequence of indices.

At 506, an operation for the generator model application may be executed. In an embodiment, the circuitry 202 may be configured to apply the generator model 112C on the quantized latent representation to generate a new synthetic image. As discussed, the generator model 112C may generate images based on the quantized latent representation. The sequence of tokens may be determined based on the application of the transformer model 114. The generator model 112C may generate the third training data 116C corresponding to the sequence of tokens.

At 508, an operation for third training data generation may be executed. In an embodiment, the circuitry 202 may be configured to generate the third training data 116C including the third image dataset corresponding to the generated new synthetic image. The third set of images 118C may be determined based on the expression (7), as follows:

$$D'_n = \{x' | x' = G_{n-1}(q_s(T_{n-1}(sos))\} \tag{7}$$

where, "$D'_n$" may be the generated third training data 116C, "x'" may be the third set of images 118C, "$G_{n-1}(\cdot)$" may be the generator model 112C, "$q_s(\cdot)$" may map the sequence of tokens (S) back to the latent representation ("$z_q$") based on a replacement of the sequence of tokens ("$S_{i,j}$") with a corresponding entry from the learned codebook 112B ("Z"), "$T_{n-1}(\cdot)$" may be the transformer model 114, and "sos" may be a start of the sequence of tokens ("S").

At 510, an operation for the transformer model pre-training may be executed. In an embodiment, the circuitry 202 may be configured to pre-train the transformer model 114 to create the next generation of the transformer model 114 based on the generated third training data 116C. The next generation of the transformer model 114 may be a new transformer model ($T_n$) that may be pre-trained on the generated third training data "$D'_n$" of the expression (7) by use of the previous generation autoencoder components. For example, the previous generation autoencoder components may include, but are not limited to, the previous generation encoder model 112A ("$E_{n-1}$"), the previous generation learned codebook 112B ("$Z_{n-1}$"), and the previous generation generator model 112C ("$G_{n-1}$").

Figure 6A:
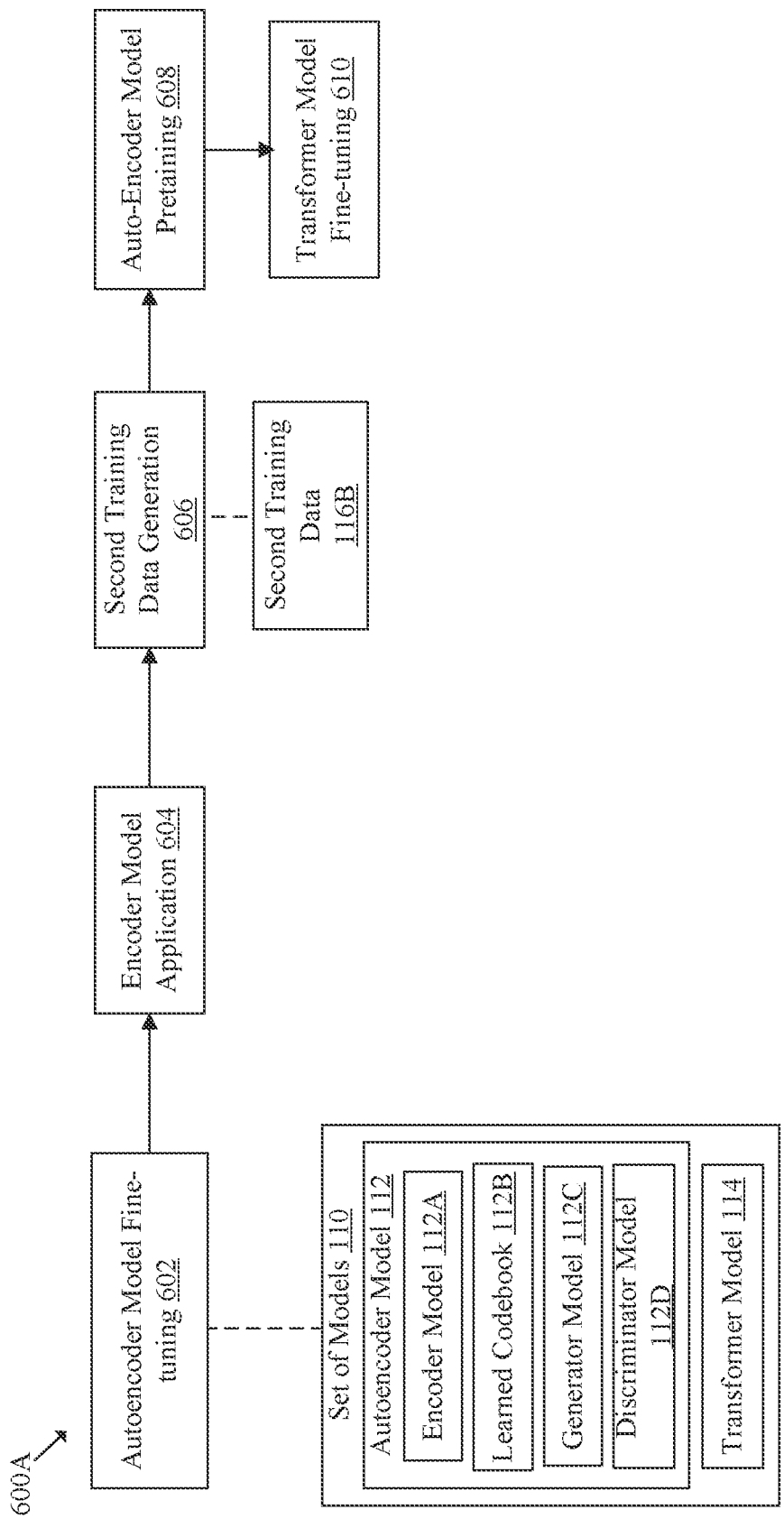
FIG. 6A is a diagram that illustrates an exemplary processing pipeline for image component generation based on an application of iterative learning on an autoencoder model, in accordance with an embodiment of the disclosure.

FIG. 6A is a diagram that illustrates an exemplary processing pipeline for image component generation based on an application of iterative learning on an autoencoder model, in accordance with an embodiment of the disclosure. FIG. 6A is explained in conjunction with elements from FIG. 1, FIG. 2, FIG. 3, FIG. 4, and FIG. 5. With reference to FIG. 6A, there is shown an exemplary processing pipeline 600A that illustrates exemplary operations from 602 to 610 for image component generation based on an application of iterative learning on the autoencoder model 112. The exemplary operations 602 to 610 may be executed by any computing system, for example, by the electronic device 102 of FIG. 1 or by the circuitry 202 of FIG. 2. The exemplary processing pipeline 600A further illustrates the set of models 110 comprising the autoencoder model 112 and the transformer model 114. The autoencoder model 112 may include the encoder model 112A, the learned codebook 112B, the generator model 112C, and the discriminator model 112D.

At 602, an operation for fine-tuning of the autoencoder model may be executed. In an embodiment, the circuitry 202 may be configured to fine-tune, based on first training data 116A including the first set of images 118A, the autoencoder model 112. The autoencoder model 112 may include the encoder model 112A, the learned codebook 112B associated with the transformer model 114, the generator model 112C, and the discriminator model 112D. The autoencoder model 112 and the transformer model 114 may be fine-tuned based on the first training data 116A in order to enhance the accuracy of the autoencoder model 112 and the transformer model 114. Further, fine-tuning of the autoencoder model 112 and the transformer model 114 may align the autoencoder model 112 and the transformer model 114 for image generation applications. In an embodiment, the autoencoder model 112 may correspond to a convolutional neural network (CNN) model based on a vector quantized generative adversarial network (VQGAN). Details related to the fine-tuning and the autoencoder model 112 are further provided, for example, in FIG. 4 (at 402).

At 604, an operation for encoder model application may be executed. The circuitry 202 may be configured to apply the encoder model 112A on the first set of images 118A based on the learned codebook 112B to determine encoded first set of images, wherein the encoded first set of images may correspond to the quantized latent representation of the first set of images 118A. As discussed, the encoder model 112A may compress each image of the first set of images 118A and may encode each image of the first set of images 118A. In an embodiment, the circuitry 202 may be further configured to map the first set of images from an image space to a signal space, based on an application of the encoder model 112A on the first set of images. Details related to the encoder model application are further provided, for example, in FIG. 4 (at 406).

At 606, an operation for second training data generation may be executed. In an embodiment, the circuitry 202 may be further configured to generate second training data (e.g., the second training data 116B) including a second image dataset (e.g., the second set of images 118B) based on a subset of images from the first training data 116A and the quantized latent representation of the subset of images. Details related to the generation of the second training data are further provided, for example, in FIG. 4 (at 408).

At 608, an operation for autoencoder pre-training may be executed. The circuitry 202 may be further configured to pre-train the autoencoder model 112 to create a next generation of the autoencoder model 112, based on the generated second training data 116B The next generation of the autoencoder model 112 may be a new autoencoder model ("$E_n$"), that may be pre-trained on the generated second training data 116B by using a previous generation autoencoder components. Details related to the pre-training of the autoencoder model 112 are further provided, for example, in FIG. 4 (at 410).

At 610, an operation for transformer model fine-tuning may be executed. The circuitry 202 may be further configured to fine-tune the transformer model 114, based on a last generation of autoencoder model ("$E_{n-1}$"). Examples of previous generation autoencoder components may include, but are not limited to, the previous generation encoder model 112A ("$E_{n-1}$"), the previous generation learned codebook 112B ("$Z_{n-1}$"), and the previous generation generator model 112C ("$G_{n-1}$"). In an embodiment, the fine-tuning of the autoencoder model 112, the pre-training of the autoencoder model 112, and the fine-tuning of the transformer model 114 may correspond to an iterative learning model (ILM). Details related to the iterative learning model are further provided for example, in FIG. 3.

Figure 6B:
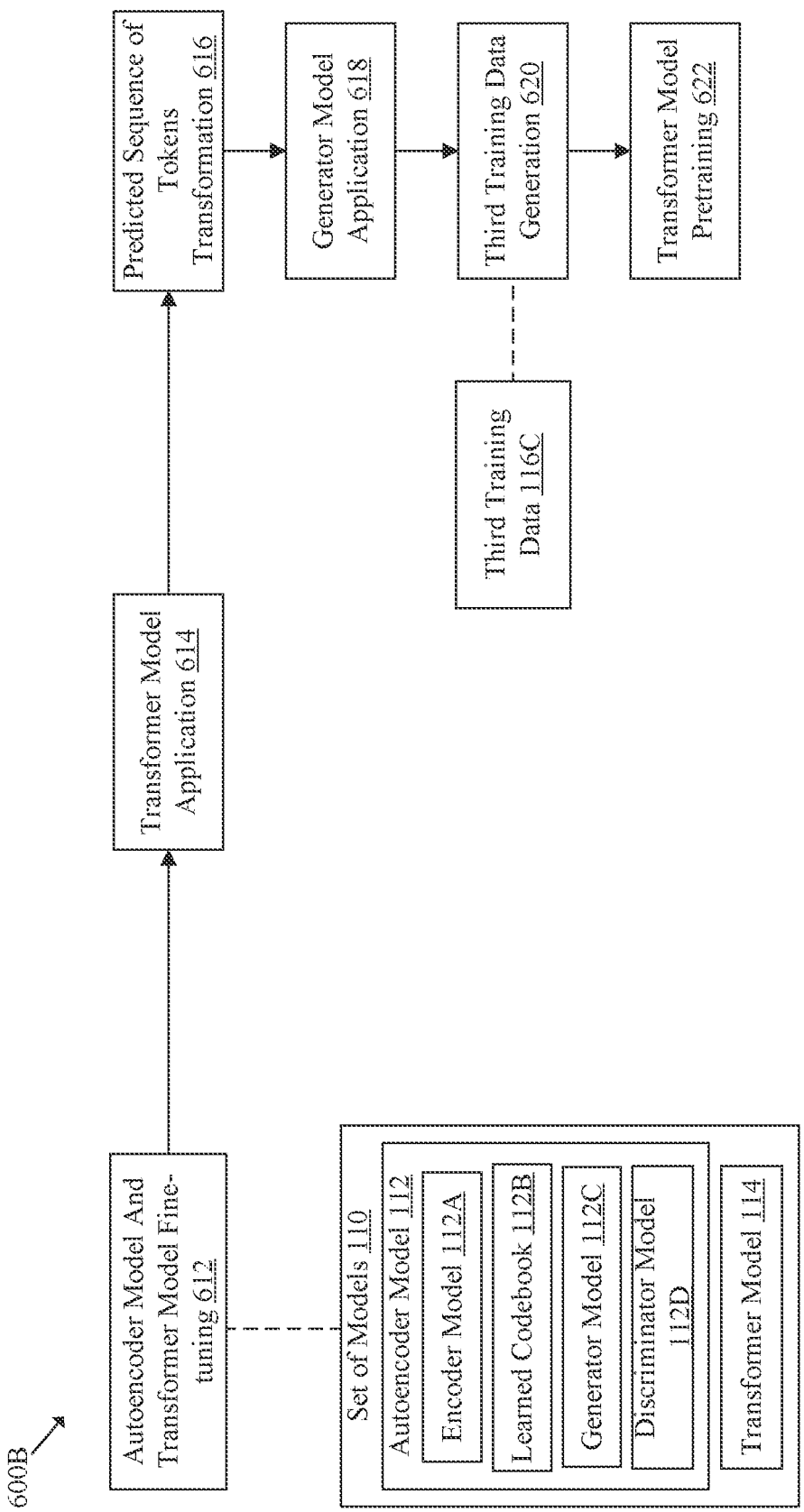
FIG. 6B is a diagram that illustrates an exemplary processing pipeline for image component generation based on an application of iterative learning on an autoencoder model and a transformer model, in accordance with an embodiment of the disclosure.

FIG. 6B is a diagram that illustrates an exemplary processing pipeline for image component generation based on an application of iterative learning on an autoencoder model and a transformer model, in accordance with an embodiment of the disclosure. FIG. 6B is explained in conjunction with elements from FIG. 1, FIG. 2, FIG. 3, FIG. 4, FIG. and FIG. 6A. With reference to FIG. 6B, there is shown an exemplary processing pipeline 600B that illustrates exemplary operations from 612 to 622 for image component generation based on an application of iterative learning on the autoencoder model 112 and the transformer model 114. The exemplary operations 612 to 622 may be executed by any computing system, for example, by the electronic device 102 of FIG. 1 or by the circuitry 202 of FIG. 2. The exemplary processing pipeline 600B further illustrates the set of models 110 comprising the autoencoder model 112 and the transformer model 114. The autoencoder model 112 may include the encoder model 112A, the learned codebook 112B, the generator model 112C, and the discriminator model 112D.

At 612, an operation for fine-tuning of the autoencoder model and the transformer model may be executed. In an embodiment, the circuitry 202 may be configured to fine-tune, based on first training data 116A including the first set of images 118A, the autoencoder model 112 and the transformer model 114 associated with the autoencoder model 112. The autoencoder model 112 may include the encoder model 112A, the learned codebook 112B with the transformer model 114, the generator model 112C, and the discriminator model 112D. The autoencoder model 112 and the transformer model 114 may be fine-tuned based on the first training data 116A in order to enhance the accuracy of the autoencoder model 112 and the transformer model 114. Further, fine-tuning of the autoencoder model 112 and the transformer model 114 may align the autoencoder model 112 and the transformer model 114 for image generation applications. In an embodiment, the autoencoder model 112 may correspond to a convolutional neural network (CNN) model based on a vector quantized generative adversarial network (VQGAN). Details related to the fine-tuning and the autoencoder model and the transformer model are further provided, for example, in FIG. 4 (at 402).

At 614, an operation for transformer model application may be executed. In an embodiment, the circuitry 202 may be further configured to apply the transformer model 114 to predict a sequence of tokens for each of the new synthetic images based on a start of the sequence of tokens. Details related to the transformer model application are further provided, for example, in FIG. 5 (at 502).

At 616, an operation for the transformation of the predicted sequence of tokens determination may be executed. In an embodiment, the circuitry 202 may be further configured to transform the predicted sequence of tokens S to a quantized latent representation ("Zq") based on the learned codebook 1128. Details related to the sequence of tokens determination are further provided, for example, in FIG. 5 (at 504).

At 618, an operation for generator model application may be executed. In an embodiment, the circuitry 202 may be further configured to apply the generator model 112C on the quantized latent representation to generate a new synthetic image. As discussed, the generator model 112C may generate images based on the quantized latent representation. The sequence of tokens may be determined based on the application of the transformer model 114. Further, the generator model 112C may generate the third training data 116C corresponding to the sequence of tokens.

At 620, an operation for third training data generation may be executed. In an embodiment, the circuitry 202 may be further configured to generate third training data (e.g., the third training data 116C) including a third image dataset (e.g., the third set of images 118C) corresponding to the generated new synthetic image. The third training data 116C may be determined based on expression (8), as follows:

$$D'_n = \{x'|x' = G_{n-1}(q_s(T_{n-1}(sos))\} \quad (8)$$

where, "$D'_n$"; may be the generated third training data, "x" may be the third image dataset, "$G_{n-1}(\ )$" may be the generator model 112C, "$q_s(\cdot)$" may map the sequence of tokens ("S") back to the latent representation ("$z_q$") by replacing the sequence of tokens ("$S_{i,j}$") with its corresponding entry from learned codebook 112B ("Z"), "$T_{n-1}(\ )$" may be the transformer model 114, and "sos" may be a start of the sequence of tokens ("S").

At 622, an operation for transformer model pre-training may be executed. The circuitry 202 may be further configured to pre-train the transformer model 114 to create a next generation of the transformer model 114, based on the generated third training data (e.g., the third training data 116C). The next generation of the transformer model 114 may be the new transformer model ($T_n$) that may be pre-trained on the generated second training data "$D'_n$" of the expression (8) by using a previous generation autoencoder components. Examples of the previous generation autoencoder components may include, but are not limited to, the previous generation encoder model 112A ("$E_{n-1}$"), the previous generation learned codebook 112B ("$Z_{n-1}$"), and the previous generation generator model 112C ("$G_{n-1}$"). In an embodiment, the fine-tuning of the autoencoder model 112 and the transformer model 114, and the pre-training of the transformer model 114 may correspond to an iterative learning model (ILM). Details related to the iterative learning model are further provided for example, in FIG. 3.

Figure 7A:
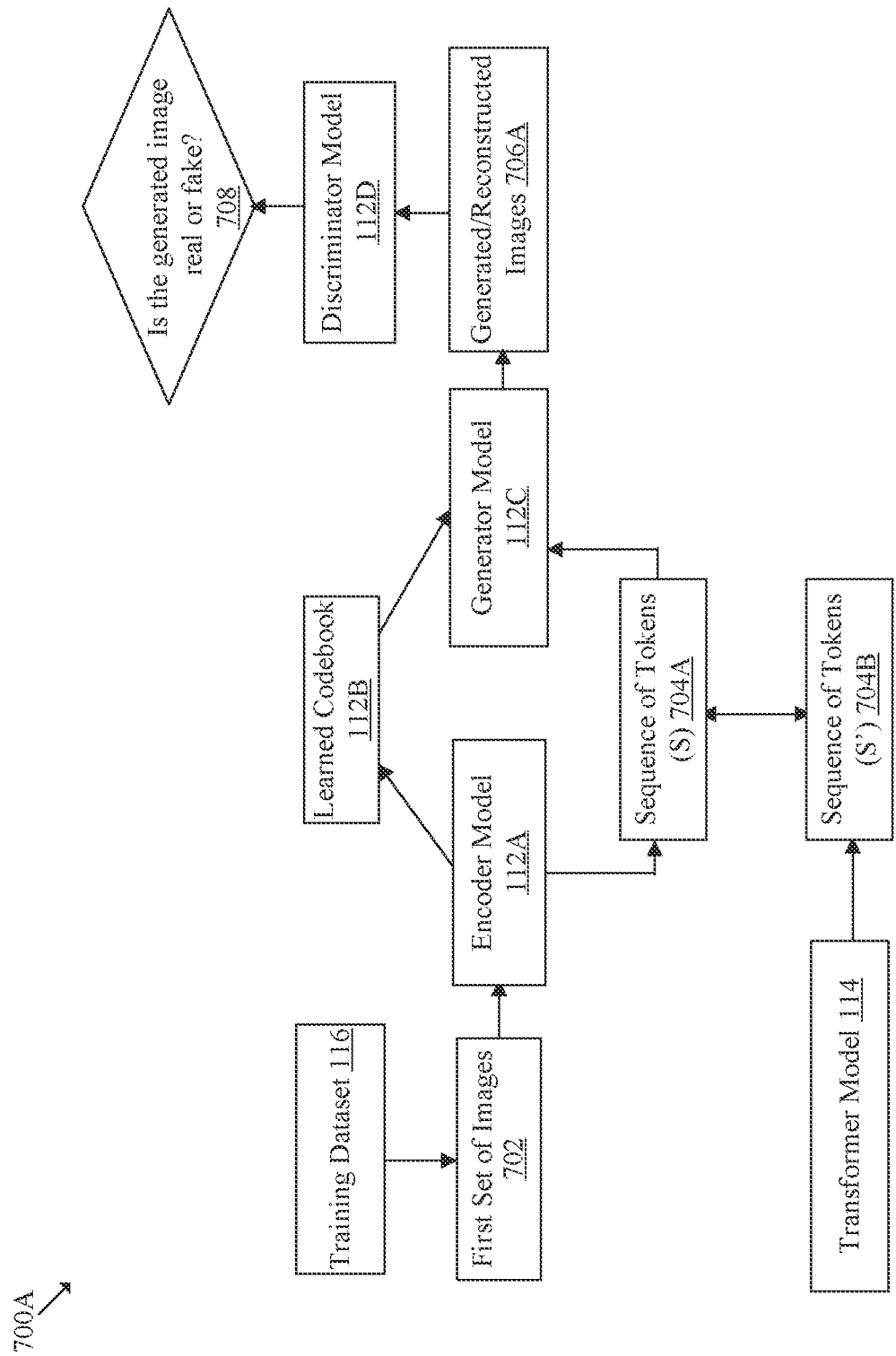
FIG. 7A is a diagram that illustrates an exemplary scenario of fine-tuning of an autoencoder model and a transformer model, in accordance with an embodiment of the disclosure.

FIG. 7A is a diagram that illustrates an exemplary scenario of fine-tuning of an autoencoder model and a transformer model, in accordance with an embodiment of the disclosure. FIG. 7A is described in conjunction with elements from FIG. 1, FIG. 2, FIG. 3, FIG. 4, FIG. 5, and FIG. 6. With reference to FIG. 7A, there is shown an exemplary scenario 700A. The scenario 700A may include the training dataset 116, a first set of images 702, the encoder model 112A, the learned codebook 1128, a sequence of tokens (S) 704A, the transformer model 114, a sequence of tokens (S') 704B, generated/reconstructed images 706A, and the discriminator model 112D. The scenario 700A further illustrates an operation 708. A set of operations associated the scenario 700A is described herein.

For example, from FIG. 7A, it may be observed that the circuitry 202 may fine-tune the autoencoder model 112 and the transformer model 114, based on first training data (including the first set of images 702), The fine-tuning of the autoencoder model 112 may correspond to the fine-tuning of the encoder model 112A, the update of the learned codebook 112B, the generation/update of the sequence of tokens (S) 704A, and the fine-tuning of the discriminator model 112D. Herein, the first set of images 702 may be passed as an input to the encoder model 112A. The encoder model 112A may encode the first set of images 702 and determine a quantized latent representation that may be transformed to the sequence of tokens (S) 704A. The quantized latent representation may be provided as an input to the generator model 112C. The generator model 112C may determine the generated/reconstructed images 706A based on the encoded first set of images 702. The reconstructed images 706A may be fed to the discriminator model 112D. An output of the discriminator model 112D may be used to determine whether or not the reconstructed images 706A are real. At 708, an operation for determination of whether the reconstructed images 706A are real or not may be executed. The circuitry 202 may determine whether the reconstructed images 706A are real or not. The determination of the reconstructed images 706A is described further, for example, in FIG. 4.

Figure 7B:
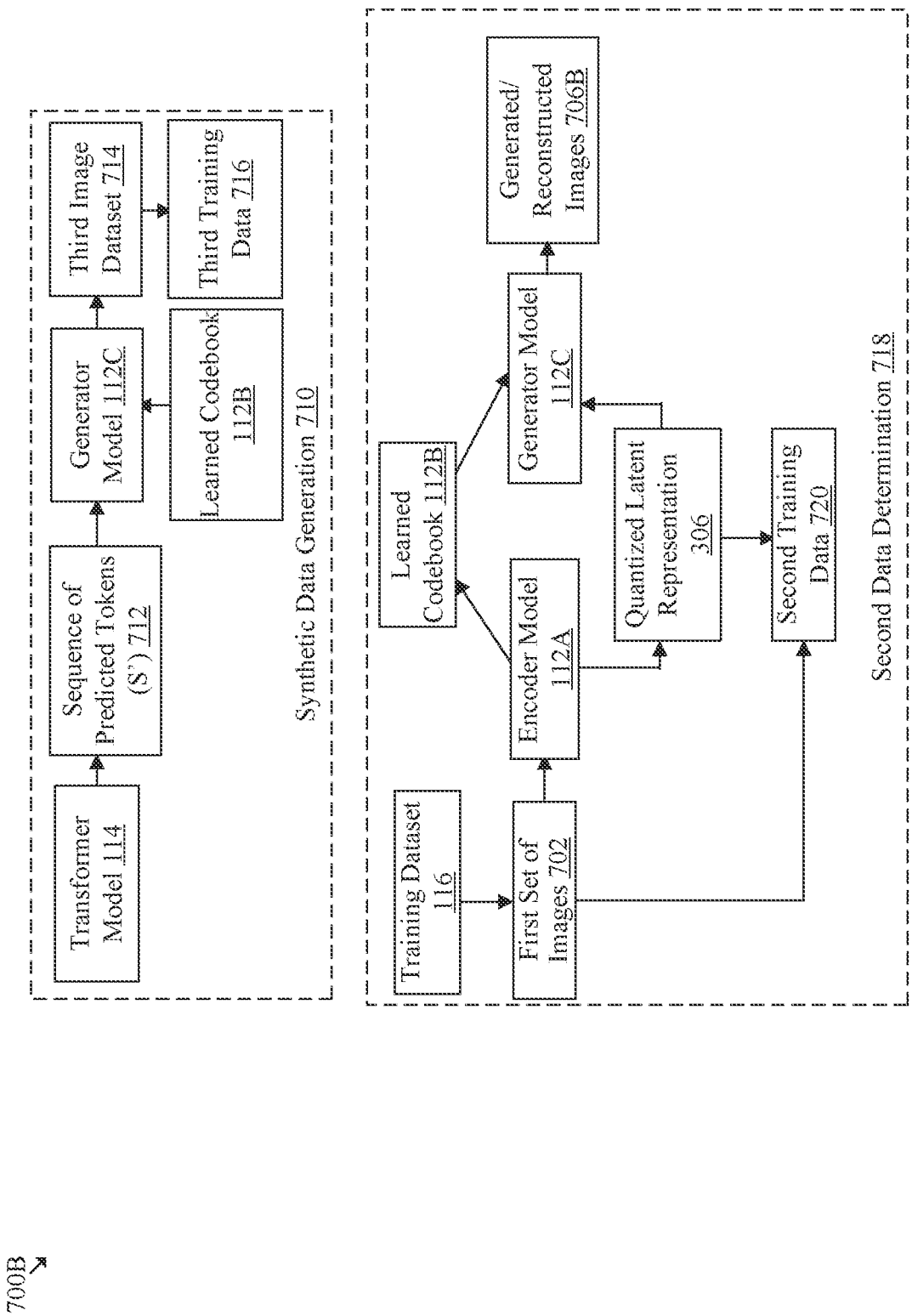
FIG. 7B is a diagram that illustrates an exemplary scenario for determination of second data and third data, in accordance with an embodiment of the disclosure.

FIG. 7B is a diagram that illustrates an exemplary scenario for determination of second data and third data, in accordance with an embodiment of the disclosure. FIG. 7B is described in conjunction with elements from FIG. 1, FIG. 2, FIG. 3, FIG. 4, FIG. 5, FIG. 6A, FIG. 6B, and FIG. 7A. With reference to FIG. 7B, there is shown an exemplary scenario 700B. The scenario 700B may include a block diagram for synthetic data generation 710 and a block diagram for second data determination 718. The block diagram for the synthetic data generation 710 may include the transformer model 114, a predicted sequence of tokens (S') 712, the generator model 112C, the learned codebook 112B, a third image dataset 714, and third training data 716. The block diagram for the second data determination 718 may include the training dataset 116, the first set of images 702, the encoder model 112A, the learned codebook 112B, the quantized latent representation 306, the generator model 112C, the generated/reconstructed images 706B, and second training data 720. A set of operations associated the scenario 700B is described herein.

For example, from FIG. 7B, it may be observed that the third training data 716 may be also referred to as synthetic data. The sequence of tokens (S') 712 obtained from the transformer model 114 may be provided as an input to the generator model 112C. The generator model 112C may generate the third image dataset 714 based on the sequence of tokens (S') 712 and the learned codebook 112B. For example, the sequence of tokens (S') 712 may be mapped from the learned codebook 112B to the quantized latent representation. The generator model 112C may be used to determine pixels associated with each image in the third training data 716. The third image dataset 714 may be determined from the third training data 716. From FIG. 7B, it may be further observed that the first set of images 702 may be provided as an input to the encoder model 112A for determination of the sequence of tokens (S) 704A. The sequence of tokens (S) 704A along with the first set of images 702 may be used to determine the second training data 720. The generation of the second training data is described further, for example, in FIGS. 4 and 6A. The generation of the third training data is described further, for example, in FIGS. 5 and 6B.

Figure 7C:
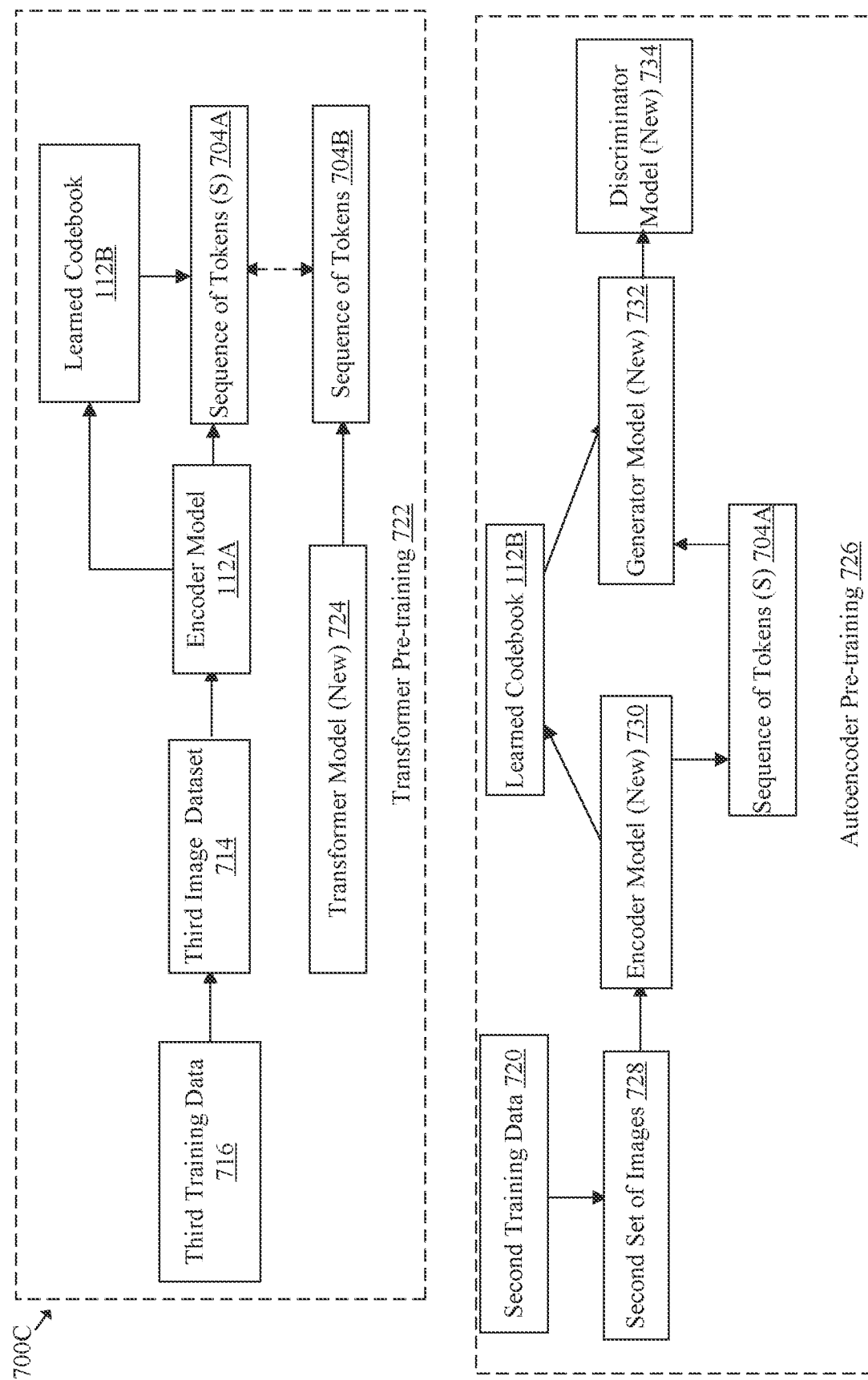
FIG. 7C is a diagram that illustrates an exemplary scenario for pre-training of an autoencoder model and a transformer model, in accordance with an embodiment of the disclosure.

FIG. 7C is a diagram that illustrates an exemplary scenario for pre-training of an autoencoder model and a transformer model, in accordance with an embodiment of the disclosure. FIG. 7C is described in conjunction with elements from FIG. 1, FIG. 2, FIG. 3, FIG. 4, FIG. 5, FIG. 6A, FIG. 6B, FIG. 7A, and FIG. 7B. With reference to FIG. 7C, there is shown an exemplary scenario 700C. The scenario 700C may include a block diagram for transformer pre-training 722 and a block diagram for an autoencoder pre-training 726. The block diagram for the transformer pre-training 722 may include the third training data 716, the third image dataset 714, the encoder model 112A, the sequence of tokens (S) 704A, the sequence of tokens (S') 704B, a transformer model (new) 724 and the learned codebook 112B. The block diagram for the autoencoder pre-training 726 may include the second training data 720, a second set of images 728, an encoder model (new) 730, the sequence of tokens (S) 704A, the learned codebook 112B, a generator model (new) 732, and a discriminator model (new) 734. A set of operations associated the scenario 700C is described herein.

It may be noted that the FIG. 7B and FIG. 7C may be collectively referred to as a knowledge transfer phase. At end of each epoch/iteration of execution of the knowledge transfer phase, a fine-tuning phase for a new generation of the autoencoder model 112 and the transformer model 114 may be executed based on the original dataset. For example, from FIG. 7C, it may be observed that the transformer model (new) 724 may be a next generation of the transformer model 114. The encoder model (new) 730 may be a next generation of the encoder model 112A. Further, the generator model (new) 732 may be a next generation of the generator model 112C. The discriminator model (new) 734 may be next generation of the discriminator model 112D. The transformer pre-training 722 may generate the next generation of the transformer model 114, such as, the transformer model (new) 724. The autoencoder pre-training 726 may generate the next generation of the encoder model 112A (e.g., the encoder model (new) 730), the generator model 112C (e.g., the generator model (new) 732), and the discriminator model 112D (e.g., the discriminator model (new) 734). The transformer pre-training 722 may be performed based on the third training data 716. The autoencoder pre-training 726 may be performed based on the second training data 720. The pre-training of the autoencoder model is described further, for example, in FIG. 4. The pre-training of the transformer model is described further, for example, in FIGS. 5 and 6B.

The electronic device 102 of the present disclosure may generate image components based on an application an iterative learning model (ILM) on the autoencoder model 112 and transformer model 114 effectively. Further, application of ILM on the VQGAN model may lead to a model that may find compositional representations for input images. The autoencoder component of the VQGAN model, such as, the autoencoder model 112, may adapt to downstream discriminative tasks faster and may generalize better, as the VQGAN model may have learned underlying components rather than unnecessary details of the input images. Further, the application of the ILM on the VQGAN model may improve an interpretability of codebook entries of the learned codebook 112B. Hence, various properties of the generated images may be attributed to groups of similarly behaving codebook entries when they are in same spatial position on a "h×w" latent representation grid, where "h" may be height and "w" may be width of images. The transformer model 114 may suffer from memorizing training sequences. Thus, the application of ILM on the transformer model 114 may increase the diversity of generated image by reducing the risk of memorization. For example, the application of ILM on the transformer model 114 may act as a data augmentation method.

It should be noted that the scenarios 700A, 700B, and 700C of FIGS. 7A, 7B, and 7C are for exemplary purposes and should not be construed to limit the scope of the disclosure.

Figure 8:
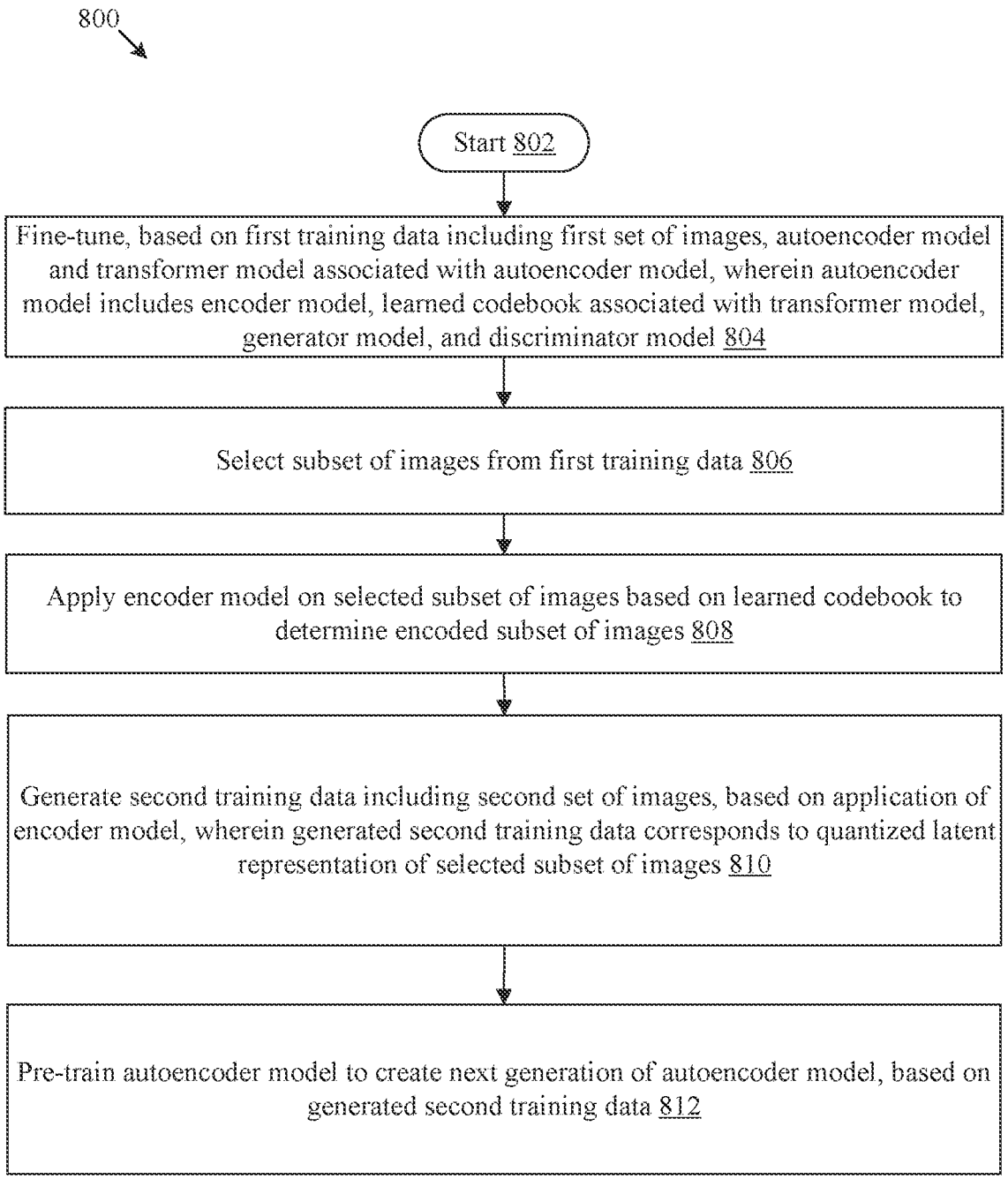
FIG. 8 is a flowchart that illustrates operations of an exemplary method for image component generation based on an application of iterative learning on an autoencoder model and a transformer model, in accordance with an embodiment of the disclosure.

FIG. 8 is a flowchart that illustrates operations of an exemplary method for image component generation based on an application of iterative learning on an autoencoder model and a transformer model, in accordance with an embodiment of the disclosure. FIG. 8 is described in conjunction with elements from FIG. 1, FIG. 2, FIG. 3, FIG. 4, FIG. 5, FIG. 6A, FIG. 6B, FIG. 7A, FIG. 7B, and FIG. 7C. With reference to FIG. 8, there is shown a flowchart 800. The flowchart 800 may include operations from 802 to 812 and may be implemented by the electronic device 102 of FIG. 1 or by the circuitry 202 of FIG. 2. The flowchart 800 may start at 802 and proceed to 804.

At 804, the autoencoder model 112 and the transformer model 114 associated with the autoencoder model 112 may be fine-tuned, based on the first training data 116A including the first set of images 118A, wherein the autoencoder model 112 may include the encoder model 112A, the learned codebook 112B associated with the transformer model 114, the generator model 112C, and the discriminator model 112D. In an embodiment, the circuitry 202 may be configured to fine-tune, based on first training data 116A including the first set of images 118A, the autoencoder model 112 and the transformer model 114 associated with the autoencoder model 112. The autoencoder model 112 may include the encoder model 112A, the learned codebook 112B associated with the transformer model 114, the generator model 112C, and the discriminator model 112D. As discussed, the autoencoder model 112 and the transformer model 114 may be fine-tuned based on the first training data 116A in order to improve accuracy of the autoencoder model 112 and the transformer model 114. Details related to the fine-tuning and the autoencoder model 112 are further provided, for example, in FIG. 4 (at 402).

At 806, the subset of images may be selected from the first training data 116A. In an embodiment, the circuitry 202 may be configured to select the subset of images from the first training data 116A. The circuitry 202 may randomly select the subset of images from the first set of images 118A. Details related to the subset of images selection are further provided, for example, in FIG. 4 (at 404).

At 808, the encoder model 112A may be applied on the selected subset of images based on the learned codebook 1128 to determine the encoded subset of images. In an embodiment, the circuitry 202 may be configured to apply the encoder model 112A on the selected subset of images based on the learned codebook 1128 to determine the encoded subset of images. Each image of the selected subset of images may be fed to the encoder model 112A. The encoder model 112A may compress each image of the selected subset of images and may encode each image of the selected subset of images. Details related to the encoding of subset of images are further provided, for example, in FIG. 4 (at 406).

At 810, the second training data 1168 including the second set of images 118A may be generated based on the application of the encoder model 112A, wherein the generated second training data 1168 may correspond to the quantized latent representation of the selected subset of images. In an embodiment, the circuitry 202 may be configured to generate the second training data 1168 including the second set of images 118A, based on the application of the encoder model 112A. The generated second training data 1168 may correspond to the quantized latent representation of the selected subset of images. The second training data 116B may include the selected subset of images and quantized latent representation of each of the selected subset of images. Thus, the second training data 1168 may be used to transfer information related to mapping of images to the quantized latent representation. Details related to the generation of the second training data are further provided, for example, in FIG. 4 (at 408).

At 812, the autoencoder model 112 may be pre-trained to create the next generation of the autoencoder model 112, based on the generated second training data 1168. In an embodiment, the circuitry 202 may be configured to pre-train the autoencoder model 112 to create the next generation of the autoencoder model 112, based on the generated second training data 1168. The pre-training of the autoencoder model 112 may pre-train the encoder model 112A, update the learned codebook 1128, pre-train the generator model 112C, and pre-train the discriminator model 112D. Details related to the pre-training of the autoencoder model are further provided, for example, in FIG. 4 (at 410). Control may pass to end.

Although the flowchart 800 is illustrated as discrete operations, such as, 804, 806, 808, 810, and 812, the disclosure is not so limited. Accordingly, in certain embodiments, such discrete operations may be further divided into additional operations, combined into fewer operations, or eliminated, depending on the implementation without detracting from the essence of the disclosed embodiments.

Figure 9:
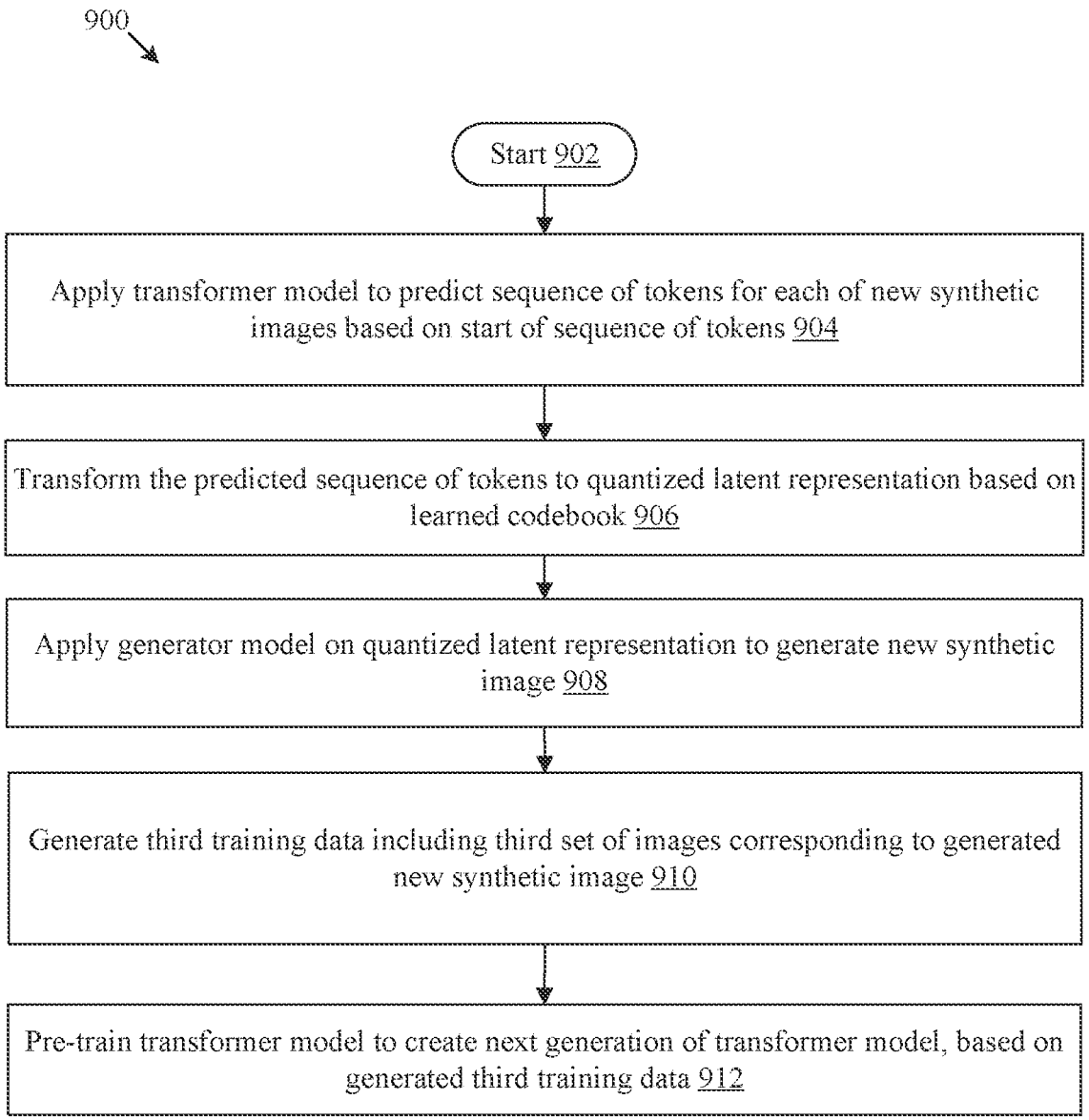
FIG. 9 is a flowchart that illustrates operations of an exemplary method for pre-training a transformer model, in accordance with an embodiment of the disclosure.

FIG. 9 is a flowchart that illustrates operations of an exemplary method for pre-training a transformer model, in accordance with an embodiment of the disclosure. FIG. 9 is described in conjunction with elements from FIG. 1, FIG. 2, FIG. 3, FIG. 4, FIG. 5, FIG. 6.A, FIG. 6B, FIG. 7A, FIG. 7B, FIG. 7C, and FIG. 8. With reference to FIG. 9, there is shown a flowchart 900. The flowchart 900 may include operations from 902 to 912 and may be implemented by the electronic device 102 of FIG. 1 or by the circuitry 202 of FIG. 2. The flowchart 900 may start at 902 and proceed to 904.

At 904, transformer model 114 may be applied to predict a sequence of tokens for each of the new synthetic images based on a start of the sequence of tokens. In an embodiment, the circuitry 202 may be configured to apply the transformer model 114 to predict a sequence of tokens for each of the new synthetic images based on a start of the sequence of tokens. Details related to the application of the transformer model are further provided, for example, in FIG. 5 (at 502).

At 906, the predicted sequence of tokens may be transformed to the quantized latent representation based on the learned codebook 112B. In an embodiment, the circuitry 202 may be configured to transform the predicted sequence of tokens to the quantized latent representation based on the learned codebook 112B. Details related to the determination of the sequence of tokens are further provided, for example, in FIG. 5 (at 504).

At 908, the generator model 112C may be applied on the quantized latent representation to generate a new synthetic image. In an embodiment, the circuitry 202 may be configured to apply the generator model 112C on the quantized latent representation to generate a new synthetic image. The generator model 112C may generate new synthetic images based on the quantized latent representation. The sequence of tokens may be determined based on the application of the transformer model 114, and the generator model 112C may generate the third training data 116C corresponding to the sequence of tokens. Details related to the generator model application are further provided, for example, in FIG. 5 (at 506).

At 910, the third training data 116C including the third set of images 118C may be generated. In an embodiment, the circuitry 202 may be configured to generate the third training data 116C including the third set of images 118C corresponding to the generated new synthetic image. Details related to the third training data generation are further provided, for example, in FIG. 5 (at 508).

At 912, the transformer model 114 may be pre-trained to create the next generation of the transformer model 114 based on the generated third training data 116C. In an embodiment, the circuitry 202 may be configured to pre-train the transformer model 114 to create the next generation of the transformer model 114 based on the generated third training data 116C. The next generation of the transformer model 114 may be the new transformer model ("$T_n$") that may be pre-trained on the generated third training data "$D'_n$" by using the previous generation autoencoder components (such as, the previous generation encoder model 112A ("$E_{n-1}$"), the previous generation learned codebook 112B ("$Z_{n-1}$"), and the previous generation generator model 112C ("$G_{n-1}$"). Details related to the pre-training of the transformer model are further provided, for example, in FIG. 5 (at 510). Control may pass to end.

Although the flowchart 900 is illustrated as discrete operations, such as, 904, 906, 908, 910, and 912, the disclosure is not so limited. Accordingly, in certain embodiments, such discrete operations may be further divided into additional operations, combined into fewer operations, or eliminated, depending on the implementation without detracting from the essence of the disclosed embodiments.

Figure 10:
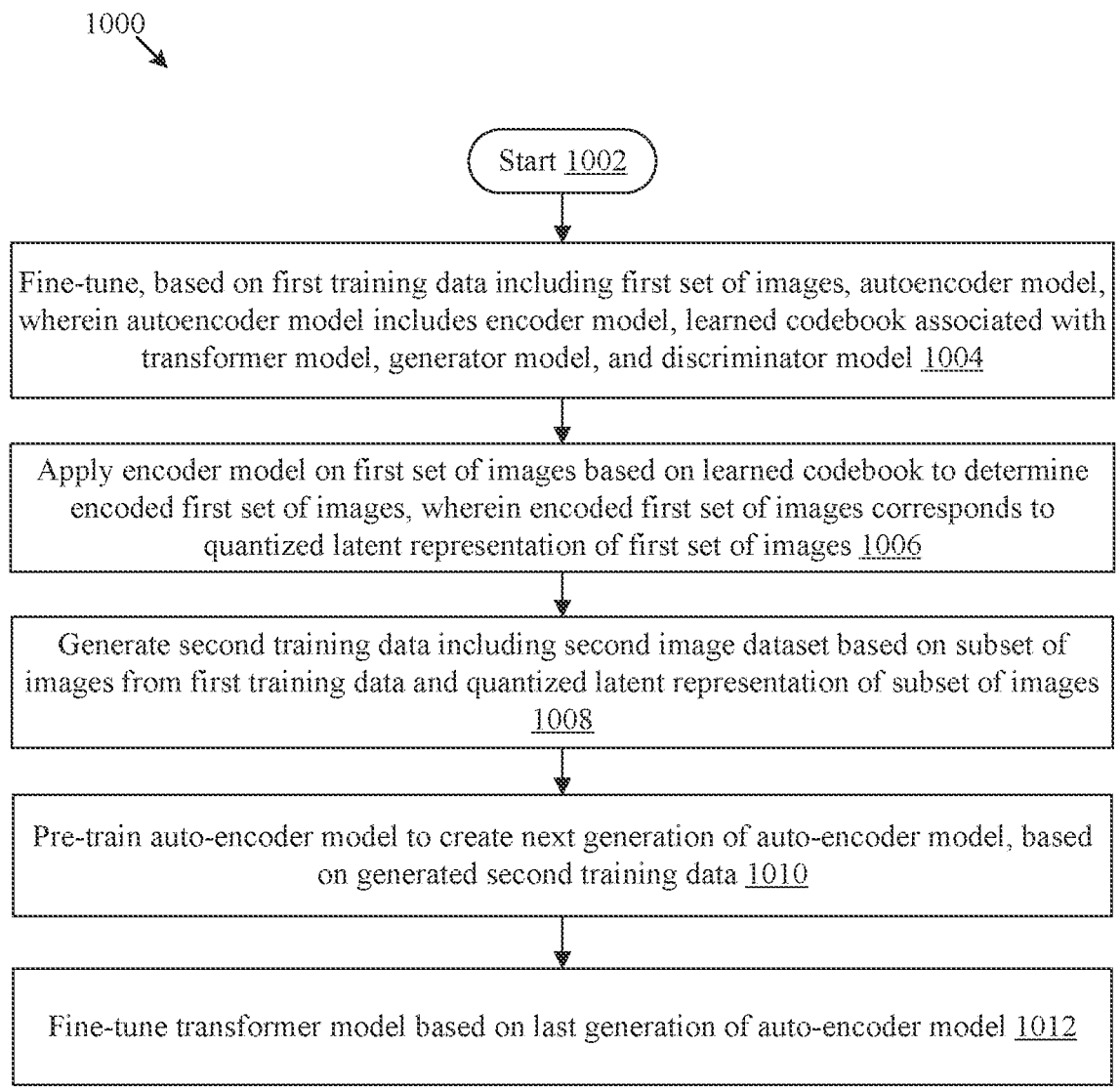
FIG. 10 is a flowchart that illustrates operations of an exemplary method for image component generation based on an application of iterative learning on an autoencoder model, in accordance with an embodiment of the disclosure.

FIG. 10 is a flowchart that illustrates operations of an exemplary method for image component generation based on an application of iterative learning on an autoencoder model, in accordance with an embodiment of the disclosure. FIG. 10 is described in conjunction with elements from FIG. 1, FIG. 2, FIG. 3, FIG. 4, FIG. 5, FIG. 6A, FIG. 6B, FIG. 7A, FIG. 7B, FIG. 7C, FIG. 8, and FIG. 9. With reference to FIG. 10, there is shown a flowchart 1000. The flowchart 1000 may include operations from 1002 to 1012 and may be implemented by the electronic device 102 of FIG. 1 or by the circuitry 202 of FIG. 2. The flowchart 1000 may start at 1002 and proceed to 1004.

At 1004, the autoencoder model 112 may be fine-tuned based on the first training data 116A including the first set of images 118A, wherein the autoencoder model 112 may include the encoder model 112A, the learned codebook 112B associated with the transformer model 114, the generator model 112C, and the discriminator model 112D. In an embodiment, the circuitry 202 may be configured to fine-tune the autoencoder model 112, based on the first training data 116A including the first set of images 118A. The autoencoder model 112 may include the encoder model 112A, the learned codebook 112B with the transformer model 114, the generator model 112C, and the discriminator model 112D. The autoencoder model 112 and the transformer model 114 may be fine-tuned based on the first training data 116A in order to enhance the accuracy of the autoencoder model 112 and the transformer model 114. Details related to the fine-tuning of the autoencoder model 112 are further provided, for example, in FIG. 6A (at 602).

At 1006, the encoder model 112A may be applied on the first set of images 118A based on the learned codebook 1128 to determine the encoded first set of images, wherein the encoded first set of images may correspond to the quantized latent representation of the first set of images 118A. In an embodiment, the circuitry 202 may be configured to apply the encoder model 112A on the subset of first set of images 118A, based on the learned codebook 112B to determine encoded set of images. The encoded first set of images may correspond to the quantized latent representation of the first subset of first set of images 118A and build the second training data. Details related to the encoder model application are further provided, for example, in FIG. 6A (at 604).

At 1008, the second training data 116B including the second image dataset may be generated based on the subset of images from the first training data 116A and the quantized latent representation of the subset of images. In an embodiment, the circuitry 202 may be further configured to generate the second training data 116B including the second image dataset based on the subset of images from the first training data 116A and the quantized latent representation of the subset of images. The details about the generation of the second training data 116B are further provided, for example in FIG. 6A (at 606).

At 1010, the autoencoder model 112 may be pre-trained to create the next generation of the autoencoder model 112, based on the generated second training data 116B. In an embodiment, the circuitry 202 may be further configured to pre-train the autoencoder model 112 to create the next generation of the autoencoder model 112, based on the generated second training data 116B. Details related to the pre-training of the autoencoder model 112 are further provided, for example, in FIG. 6A (at 608).

At 1012, the transformer model 114 may be fine-tuned based on the last generation of autoencoder model 112. In an embodiment, the circuitry 202 may be further configured to fine-tune the transformer model 114 based on the last generation of autoencoder model 112. Details related to the fine-tuning of the transformer model 114 are further provided, for example, in FIG. 6A (at 610). Control may pass to end.

Although the flowchart 1000 is illustrated as discrete operations, such as, 1004, 1006, 1008, 1010, and 1012, the disclosure is not so limited. Accordingly, in certain embodiments, such discrete operations may be further divided into additional operations, combined into fewer operations, or eliminated, depending on the implementation without detracting from the essence of the disclosed embodiments.

Figure 11:
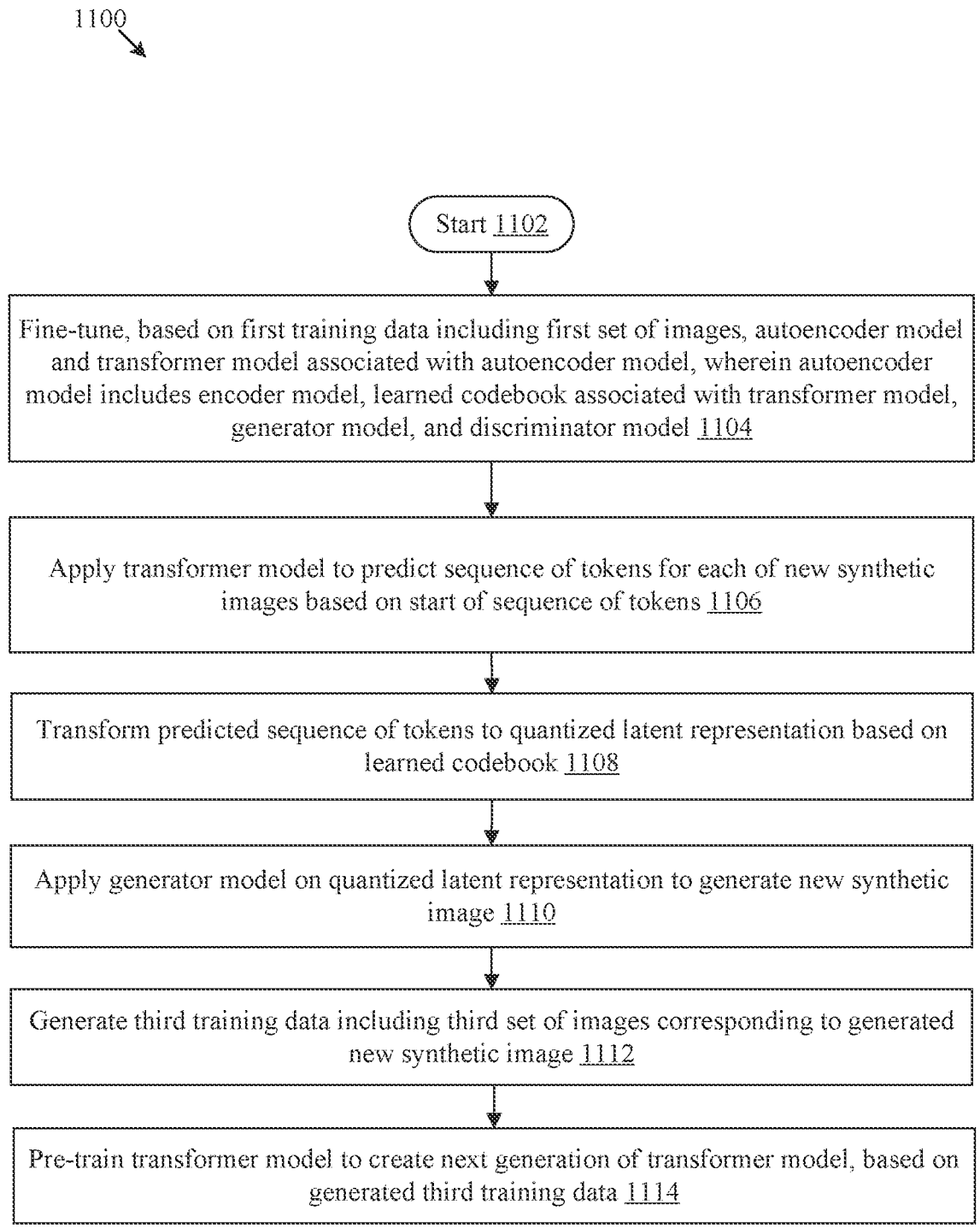
FIG. 11 is a flowchart that illustrates operations of an exemplary method for image component generation based on an application of iterative learning on an autoencoder model and a transformer model, in accordance with an embodiment of the disclosure.

FIG. 11 is a flowchart that illustrates operations of an exemplary method for image component generation based on an application of iterative learning on an autoencoder model and a transformer model, in accordance with an embodiment of the disclosure. FIG. 11 is described in conjunction with elements from FIG. 1, FIG. 2, FIG. 3, FIG. 4, FIG. 5, FIG. 6A, FIG. 6B, FIG. 7A, FIG. 7B, FIG. 7C, FIG. 8, FIG. 9, and FIG. 10. With reference to FIG. 11, there is shown a flowchart 1100. The flowchart 1100 may include operations from 1102 to 1114 and may be implemented by the electronic device 102 of FIG. 1 or by the circuitry 202 of FIG. 2. The flowchart 1100 may start at 1102 and proceed to 1104.

At 1104, the autoencoder model 112 and the transformer model 114 associated with the autoencoder model 112 may be fine-tuned based on first training data 116A including the first set of images 118A, wherein the autoencoder model 112 may include the encoder model 112A, the learned codebook 112B associated with the transformer model 114, the generator model 112C, and the discriminator model 112D. In an embodiment, the circuitry 202 may be configured to fine-tune, based on first training data 116A including the first set of images 118A, the autoencoder model 112 and the transformer model 114 associated with the autoencoder model 112. The autoencoder model 112 may include the encoder model 112A, the learned codebook 112B with the transformer model 114, the generator model 112C, and the discriminator model 112D. The autoencoder model 112 and the transformer model 114 may be fine-tuned based on the first training data 116A in order to enhance the accuracy of the autoencoder model 112 and the transformer model 114. Details related to the fine-tuning of the autoencoder model 112 and the transformer model 114 are further provided, for example, in FIG. 6B (at 612).

At 1106, the transformer model 114 may be applied to predict the sequence of tokens for each of the new synthetic images based on the start of sequence of tokens. In an embodiment, the circuitry 202 may be configured to apply the transformer model 114 to predict the sequence of tokens for each of the new synthetic images based on the start of sequence of tokens. Details related to the application of the transformer model 114 are further provided, for example, in FIG. 6B (at 616).

At 1108, the predicted sequence of tokens may be transformed to the quantized latent representation based on the learned codebook 112B. In an embodiment, the circuitry 202 may be configured to transform the predicted sequence of tokens to the quantized latent representation based on the learned codebook 112B. Details related to the transformation of the predicted sequence of tokens are further provided, for example, in FIG. 6B (at 618).

At 1110, the generator model 112C may be applied on the quantized latent representation to generate the new synthetic image. In an embodiment, the circuitry 202 may be configured to apply the generator model 112C on the quantized latent representation to generate the new synthetic image. Details related to the generator model 112C application are further provided, for example, in FIG. 6B (at 620).

At 1112, the third training data 116C including the third set of images 118C corresponding to the generated new synthetic image may be generated. In an embodiment, the circuitry 202 may be configured to generate the third training data 116C including the third set of images 118C corresponding to the generated new synthetic image. Details related to the third training data generation are further provided, for example, in FIG. 6B (at 622).

At 1114, transformer model 114 may be pre-trained to create the next generation of the transformer model 114, based on the generated third training data 116C. In an embodiment, the circuitry 202 may be configured to pre-train the transformer model 114 to create the next generation of the transformer model 114, based on the generated third training data 116C. Details related to the transformer model pre-training are further provided, for example, in FIG. 7C (at 722).

Although the flowchart 1100 is illustrated as discrete operations, such as, 1104, 1106, 1108, 1110, 1112, and 1114, the disclosure is not so limited. Accordingly, in certain embodiments, such discrete operations may be further divided into additional operations, combined into fewer operations, or eliminated, depending on the implementation without detracting from the essence of the disclosed embodiments.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include fine-tuning, based on first training data (for example, the first training data 116A of FIG. 1) including a first set of images (for example, the first set of images 118A of FIG. 1), an autoencoder model (for example, the autoencoder model 112 of FIG. 1) and a transformer model (for example, the transformer model 114 of FIG. 1) associated with the autoencoder model 112. The autoencoder model may include an encoder model (for example, the encoder model 112A of FIG. 1), a learned codebook (for example, the learned codebook 112B of FIG. 1) associated with the transformer model 114, a generator model (for example, the generator model 112C of FIG. 1), and a discriminator model (for example, the discriminator model 112D of FIG. 1). The operations may further include selection of a subset of images from the first training data 116A to build the second training data 116B. The operations may further include application of the encoder model 112A on the selected subset of images based on the learned codebook 1128 to determine encoded subset of images to build the second training data 116B. The operations may further include generation of second training data (e.g., the second training data 116B) including a second set of images (e.g., the second set of images 118B), based on the application of the encoder model 112A. The generated second training data 116B may correspond to a quantized latent representation of the selected subset of images. The operations may further include pre-training the autoencoder model 112 to create a next generation of the autoencoder model 112, based on the generated second training data 116B.

Various embodiments of the disclosure may provide a non-transitory computer-readable medium and/or storage medium having stored thereon, computer-executable instructions executable by a machine and/or a computer to operate an electronic device (for example, the electronic device 102 of FIG. 1). Such instructions may cause the electronic device 102 to perform operations that may include fine-tuning, based on first training data (for example, the on first training data 116A of FIG. 1) including a first set of images (for example, the first set of images 118A of FIG. 1), an autoencoder model (for example, the autoencoder model 112 of FIG. 1) and a transformer model (for example, the transformer model 114 of FIG. 1) associated with the autoencoder model 112. The autoencoder model 112 may include an encoder model (for example, encoder model 112A of FIG. 1), a learned codebook (for example, the learned codebook 1128 of FIG. 1) associated with the transformer model 114, a generator model (for example, the generator model 112C of FIG. 1), and a discriminator model (for example, the discriminator model 112D. The operations may further include applying the transformer model (for example, the transformer model 114 of FIG. 1) to predict a sequence of tokens for each of the new synthetic images based on a start of the sequence of tokens. The operations may further include transforming the predicted sequence of tokens to a quantized latent representation based on the learned codebook (for example, the learned codebook 1128 of FIG. 1). The operations may further include applying the generator model (for example, the generator model 112C of FIG. 1) on the quantized latent representation to generate a new synthetic image. The operations may further include generating third training data including a third set of images corresponding to the generated new synthetic image. The operations may further include pre-training the transformer model 114 to create a next generation of the transformer model 114, based on the generated second training data 1168.

Exemplary aspects of the disclosure may provide an electronic device (such as, the electronic device 102 of FIG. 1) that includes circuitry (such as, the circuitry 202). The circuitry 202 may be configured to fine-tune, based on first training data (for example, the first training data 116A of FIG. 1) including a first set of images (for example, the first set of images 118A of FIG. 1), an autoencoder model (for example, the autoencoder model 112 of FIG. 1) and a transformer model (for example, the transformer model 114 of FIG. 1) associated with the autoencoder model 112. The autoencoder model 112 may include an encoder model (for example, the encoder model 112A of FIG. 1), a learned codebook (for example, the learned codebook 112B of FIG. 1) associated with the transformer model 114, a generator model (for example, the generator model 112C of FIG. 1), and a discriminator model (for example, the discriminator model 112D of FIG. 1). The circuitry 202 may be configured to select a subset of images from the first training data 116A. The circuitry 202 may be configured to apply the encoder model 112A on the selected subset of images based on the learned codebook 1128 to determine encoded subset of images. The circuitry 202 may be configured to generate second training data (e.g., the second training data 116B) including a second set of images (e.g., the second set of images 118B), based on the application of the encoder model 112A. The generated second training data 1168 may correspond to a quantized latent representation of the selected subset of images. The circuitry 202 may be configured to pre-train the autoencoder model 112 to create a next generation of the autoencoder model 112, based on the generated second training data 1168.

Exemplary aspects of the disclosure may provide an electronic device (such as, the electronic device 102 of FIG. 1) that includes circuitry (such as, the circuitry 202). The circuitry 202 may be configured to fine-tune, based on first training data (for example, the on first training data 116A of FIG. 1) including a first set of images (for example, the first set of images 118A of FIG. 1), an autoencoder model (for example, the autoencoder model 112 of FIG. 1) and a transformer model (for example, the transformer model 114 of FIG. 1) associated with the autoencoder model 112. The autoencoder model 112 may include an encoder model (for example, encoder model 112A of FIG. 1), a learned codebook (for example, the learned codebook 112B of FIG. 1) associated with the transformer model 114, a generator model (for example, the generator model 112C of FIG. 1), and a discriminator model (for example, the discriminator model 112D. The circuitry 202 may be configured to apply the encoder model 112A on the first set of images 118A based on the learned codebook 1128 to determine encoded first set of images. The encoded first set of images may correspond to a quantized latent representation of the first set of images 118A. The circuitry 202 may be configured to apply the transformer model (for example, the transformer model 114 of FIG. 1) to predict a sequence of tokens for each of the new synthetic images based on a start of the sequence of tokens. The circuitry 202 may be configured transform the predicted sequence of tokens to a quantized latent representation based on the learned codebook (for example, the learned codebook 1128 of FIG. 1). The circuitry 202 may be configured apply the generator model (for example, the generator model 112C of FIG. 1) on the quantized latent representation to generate a new synthetic image. The circuitry 202 may be configured generate third training data including a third set of images corresponding to the generated new synthetic image. The circuitry 202 may be configured pre-train the transformer model 114 to create a next generation of the transformer model 114, based on the generated second training data 116B In an embodiment, the predicted sequence of tokens may correspond to a sequence of indices from the learned codebook 112B.

In an embodiment, the fine-tuning of the autoencoder model 112 and the transformer model 114, and the pre-training of the autoencoder model 112 may correspond to an iterative learning model (ILM). In another embodiment, the fine-tuning of the autoencoder model 112 and the transformer model 114, and the pre-training of the transformer model 114 may correspond to the iterative learning model (ILM).

In an embodiment, the autoencoder model 112 may correspond to a convolutional neural network (CNN) model based on a vector quantized generative adversarial network (VQGAN).

In an embodiment, the circuitry 202 may be further configured to map the selected subset of images from an image space to a signal space, based on an application of the encoder model 112A on the selected subset of images. In an embodiment, the signal space may correspond to the learned codebook 112B.

In an embodiment, the quantized latent representation of the selected subset of images may be determined based on a replacement of each vector, of a set of multi-dimensional code vectors associated with the selected subset of images, with a closest entry from the learned codebook 112B.

In an embodiment, the circuitry 202 may be further configured to determine a first loss function associated with the encoder model 112A, the learned codebook 112B, and the generator model 112C. The circuitry 202 may be further configured to determine a second loss function associated with the autoencoder model 112. The circuitry 202 may be further configured to determine a third loss function associated with the encoder model 112A. The pre-training of the autoencoder model 112 may be further based on the determined first loss function, the determined second loss function, and the determined third loss function.

In an embodiment, the determination of the third loss function may be based on a second norm, associated with the encoder model of the next generation of the autoencoder model 112, with respect to the learned codebook 112B.

The present disclosure may also be positioned in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made, and equivalents may be substituted without departure from the scope of the present disclosure. In addition, many modifications may be made to adapt a particular situation or material to the teachings of the present disclosure without departure from its scope. Therefore, it is intended that the present disclosure is not limited to the embodiment disclosed, but that the present disclosure will include all embodiments that fall within the scope of the appended claims.

What is claimed is:

1. An electronic device, comprising: circuitry configured to: fine-tune, based on first training data including a first set of images, an autoencoder model and a transformer model associated with the autoencoder model, wherein the autoencoder model includes an encoder model, a learned codebook associated with the transformer model, a generator model, and a discriminator model; select a subset of images from the first training data; apply the encoder model on the selected subset of images based on the learned codebook to determine encoded subset of images; generate second training data including a second set of images, based on the application of the encoder model, wherein the generated second training data corresponds to a quantized latent representation of the selected subset of images; and pre-train the autoencoder model to create a next generation of the autoencoder model, based on the generated second training data, wherein the next generation of the autoencoder model is used to generate specific training data for a next generation of the transformer model.

2. The electronic device according to claim 1, wherein the circuitry is further configured to: apply the transformer model to predict a sequence of tokens for each of new synthetic images based on a start of the sequence of tokens; transform the predicted sequence of tokens to a quantized latent representation based on the learned codebook; apply the generator model on the quantized latent representation to generate a new synthetic image; generate third training data including a third set of images corresponding to the generated new synthetic image; and pre-train the transformer model to create the next generation of the transformer model, based on the generated third training data.

3. The electronic device according to claim 2, wherein the predicted sequence of tokens corresponds to a sequence of indices from the learned codebook.

4. The electronic device according to claim 1, wherein the fine-tuning of the autoencoder model and the transformer model, and the pre-training of the autoencoder model corresponds to an iterative learning model (ILM).

5. The electronic device according to claim 1, wherein the autoencoder model corresponds to a convolutional neural network (CNN) model based on a vector quantized generative adversarial network (VQGAN).

6. The electronic device according to claim 1, wherein the circuitry is further configured to map the selected subset of images from an image space to a signal space, based on an application of the encoder model on the selected subset of images.

7. The electronic device according to claim 6, wherein the signal space corresponds to the learned codebook.

8. The electronic device according to claim 7, wherein the quantized latent representation of the selected subset of images is determined based on a replacement of each vector, of a set of multi-dimensional code vectors associated with the selected subset of images, with a closest entry from the learned codebook.

9. The electronic device according to claim 1, wherein the circuitry is further configured to:
   determine a first loss function associated with the encoder model, the learned codebook, and the generator model;
   determine a second loss function associated with the autoencoder model; and
   determine a third loss function associated with the encoder model, wherein the pre-training of the autoencoder model is further based on the determined first loss function, the determined second loss function, and the determined third loss function.

10. The electronic device according to claim 9, wherein the determination of the third loss function is based on a second norm, associated with the encoder model of the next generation of the autoencoder model, with respect to the learned codebook.

11. An electronic device, comprising: circuitry configured to: fine-tune, based on first training data including a first set of images, an autoencoder model, wherein the autoencoder model includes an encoder model, a learned codebook associated with a transformer model, a generator model, and a discriminator model; apply the encoder model on the first set of images based on the learned codebook to determine encoded first set of images, wherein the encoded first set of images corresponds to a quantized latent representation of the first set of images; generate second training data including a second image dataset based on a subset of images from the first training data and the quantized latent representation of the subset of images; pre-train the autoencoder model to create a next generation of the autoencoder model, based on the generated second training data, wherein the next generation of the autoencoder model is used to generate specific training data for a next generation of the transformer model; and fine-tune the transformer model based on a last generation of the autoencoder model, wherein the last generation of the autoencoder model is previous to the next generation of the autoencoder model.

12. The electronic device according to claim 11, wherein the fine-tuning of the autoencoder model, the pre-training of the autoencoder, and fine-tuning of the transformer model corresponds to an iterative learning model (ILM).

13. The electronic device according to claim 11, wherein the autoencoder model corresponds to a convolutional neural network (CNN) model based on a vector quantized generative adversarial network (VQGAN).

14. The electronic device according to claim 11, wherein the circuitry is further configured to map the first set of images from an image space to a signal space, based on an application of the encoder model on the first set of images.

15. The electronic device according to claim 14, wherein the signal space corresponds to the learned codebook.

16. The electronic device according to claim 15, wherein the quantized latent representation of the first set of images is determined based on a replacement of each vector, of a set of multi-dimensional code vectors associated with the first set of images, with a closest entry from the learned codebook.

17. An electronic device, comprising: circuitry configured to: fine-tune, based on first training data including a first set of images, an autoencoder model and a transformer model associated with the autoencoder model, wherein the autoencoder model includes an encoder model, a learned codebook associated with the transformer model, a generator model, and a discriminator model; apply the transformer model to predict a sequence of tokens for each of new synthetic images based on a start of the sequence of tokens; transform the predicted sequence of tokens to a quantized latent representation based on the learned codebook; apply the generator model on the quantized latent representation to generate a new synthetic image; generate third training data including a third set of images corresponding to the generated new synthetic image; and pre-train the transformer model to create a next generation of the transformer model, based on the generated third training data, wherein the next generation of the transformer model is used for the prediction in a subsequent training cycle.

18. The electronic device according to claim 17, wherein the fine-tuning of the autoencoder model and the transformer model, and the pre-training of the transformer model corresponds to an iterative learning model (ILM).

19. A method, comprising: in an electronic device: fine-tuning, based on first training data including a first set of images, an autoencoder model and a transformer model associated with the autoencoder model, wherein the autoencoder model includes an encoder model, a learned codebook associated with the transformer model, a generator model, and a discriminator model; selecting a subset of images from the first training data; applying the encoder model on the selected subset of images based on the learned codebook to determine encoded subset of images; generating second training data including a second set of images, based on the application of the encoder model, wherein the generated second training data corresponds to a quantized latent representation of the selected subset of images; and pre-training the autoencoder model to create a next generation of the autoencoder model, based on the generated second training data, wherein the next generation of the autoencoder model is used to generate specific training data for a next generation of the transformer model.

20. The method according to claim 19, further comprising: applying the transformer model to predict a sequence of tokens for each of new synthetic images based on a start of sequence of token; transforming the predicted sequence of tokens to a quantized latent representation based on the learned codebook; applying the generator model on the quantized latent representation to generate a new synthetic image; generating third training data including a third set of images corresponding to the generated new synthetic image; and pre-training the transformer model to create the next generation of the transformer model, based on the generated third training data.

* * * * *